(12) United States Patent
Coffey et al.

(10) Patent No.: US 8,555,870 B2
(45) Date of Patent: Oct. 15, 2013

(54) PACKAGE HEATING DEVICE AND CHEMICAL COMPOSITIONS FOR USE THEREWITH

(75) Inventors: Brendan Coffey, Austin, TX (US); Krzysztof Czeslaw Kwiatkowski, Austin, TX (US); Travis Bookout, Kyle, TX (US)

(73) Assignee: Heatgenie, Inc., Austin, TX (US)

( * ) Notice: Subject to any disclaimer, the term of this patent is extended or adjusted under 35 U.S.C. 154(b) by 237 days.

(21) Appl. No.: 13/177,502

(22) Filed: Jul. 6, 2011

(65) Prior Publication Data

US 2012/0031390 A1 Feb. 9, 2012

Related U.S. Application Data

(60) Provisional application No. 61/361,909, filed on Jul. 6, 2010.

(51) Int. Cl.
*F24J 1/00* (2006.01)

(52) U.S. Cl.
USPC ............ 126/263.08; 126/263.01; 126/263.05; 126/263.07; 126/263.09

(58) Field of Classification Search
USPC ........................................ 126/263.01–263.09
See application file for complete search history.

(56) References Cited

U.S. PATENT DOCUMENTS

| | | | |
|---|---|---|---|
| 2,384,278 A | | 9/1945 | Caldwell |
| 2,386,654 A | * | 10/1945 | Caldwell .................. 126/263.01 |
| 2,953,443 A | * | 9/1960 | Lloyd .............................. 149/37 |
| 3,025,153 A | * | 3/1962 | Cross ............................... 149/40 |
| 3,079,911 A | * | 3/1963 | Ryan et al. ............... 126/263.07 |
| 3,399,663 A | * | 9/1968 | Klaiber .......................... 126/262 |
| 3,527,201 A | * | 9/1970 | Epstein .................... 126/263.01 |
| 3,561,424 A | * | 2/1971 | Failla ....................... 126/263.09 |
| 3,874,365 A | * | 4/1975 | Pava ........................ 126/263.01 |
| 3,980,070 A | | 9/1976 | Krupa |
| 4,013,061 A | * | 3/1977 | Trumble et al. ................. 44/250 |
| 4,043,314 A | * | 8/1977 | Trumble et al. .......... 126/263.01 |
| 4,464,989 A | * | 8/1984 | Gibson et al. ................. 102/202 |
| 4,506,654 A | | 3/1985 | Zellweger et al. |
| 4,658,886 A | | 4/1987 | Carlson et al. |
| 4,741,324 A | * | 5/1988 | Ina et al. .................. 126/263.06 |

(Continued)

FOREIGN PATENT DOCUMENTS

| | | |
|---|---|---|
| AT | 443465 T | 10/2009 |
| AU | 2003-256246 A1 | 11/2003 |

(Continued)

*Primary Examiner* — Kenneth Rinehart
*Assistant Examiner* — Jorge Pereiro
(74) *Attorney, Agent, or Firm* — Dubois, Bryant, & Campbell, LLP; William D. Wiese

(57) ABSTRACT

A heating device comprises a heating chamber defining an interior space for receiving and storing a substance to be heated, a heater for use as a source of heat which includes a reaction chamber, a solid state reaction composition disposed within the reaction chamber such that it is physically isolated from and in thermal communication with the interior space of the heating chamber, an activation mechanism in communication with the composition disposed within the reaction chamber, and wherein the reaction composition is inert until the activation mechanism is actuated. Activation mechanism comprises an actuator having a user interface portion and an actuation portion, and the actuation portion carries a reaction initiation material that, when assembled with the heater, is capable of initiating a chemical reaction in the chemical composition when the actuation portion is actuated by a user.

19 Claims, 19 Drawing Sheets

(56) References Cited

U.S. PATENT DOCUMENTS

| | | | |
|---|---|---|---|
| 4,819,612 A | | 4/1989 | Okamoto et al. |
| 4,949,702 A | | 8/1990 | Suzuki et al. |
| 4,989,515 A | * | 2/1991 | Kelly et al. ................ 102/202.9 |
| 4,989,729 A | * | 2/1991 | Huang ......................... 206/222 |
| 4,996,922 A | * | 3/1991 | Halcomb et al. ............. 102/205 |
| 5,012,795 A | | 5/1991 | Suzuki et al. |
| 5,073,454 A | * | 12/1991 | Graham ........................ 428/403 |
| 5,454,363 A | * | 10/1995 | Sata .......................... 126/263.01 |
| 5,593,792 A | * | 1/1997 | Farrier et al. ..................... 429/8 |
| 5,650,590 A | | 7/1997 | Taylor |
| 5,700,974 A | | 12/1997 | Taylor |
| 5,984,953 A | * | 11/1999 | Sabin et al. .................... 607/114 |
| 6,079,405 A | * | 6/2000 | Justo ....................... 126/263.08 |
| 6,248,257 B1 | | 6/2001 | Bell et al. |
| 6,267,110 B1 | * | 7/2001 | Tenenboum et al. .... 126/263.01 |
| 6,328,943 B1 | | 12/2001 | Roling et al. |
| 6,627,013 B2 | | 9/2003 | Carter |
| 6,986,345 B2 | | 1/2006 | Kolb |
| 7,025,055 B2 | * | 4/2006 | Scudder et al. .......... 126/263.08 |
| 7,350,362 B2 | * | 4/2008 | Danwoody ........................ 62/4 |
| 7,721,556 B2 | | 5/2010 | Guida |
| 7,878,188 B2 | * | 2/2011 | Barksdale ................ 126/263.09 |
| 8,132,977 B2 | * | 3/2012 | Pires et al. ....................... 401/88 |
| 2002/0017291 A1 | * | 2/2002 | Searle et al. ............. 126/263.03 |
| 2003/0145752 A1 | | 8/2003 | Carter |
| 2003/0145924 A1 | | 8/2003 | Carter |
| 2004/0206346 A1 | * | 10/2004 | Tenenboum et al. ..... 126/263.06 |
| 2005/0051156 A1 | * | 3/2005 | Schreff et al. ........... 126/263.09 |
| 2006/0086097 A1 | | 4/2006 | Guida |
| 2006/0169276 A1 | * | 8/2006 | Scudder et al. .......... 126/263.08 |
| 2007/0163569 A1 | * | 7/2007 | Strachan ................ 126/263.09 |
| 2007/0164253 A1 | | 7/2007 | Iannicelli |
| 2007/0261692 A1 | * | 11/2007 | Bolmer et al. ........... 126/263.01 |
| 2008/0072765 A1 | * | 3/2008 | Barksdale ....................... 99/275 |
| 2008/0251063 A1 | | 10/2008 | Palena et al. |
| 2010/0206889 A1 | | 8/2010 | Mercade |
| 2010/0239877 A1 | * | 9/2010 | Paul et al. ...................... 428/544 |
| 2010/0252022 A1 | * | 10/2010 | Coffey et al. ........... 126/263.01 |
| 2010/0252023 A1 | * | 10/2010 | Coffey et al. ........... 126/263.01 |
| 2011/0240656 A1 | | 10/2011 | Widitora et al. |

FOREIGN PATENT DOCUMENTS

| | | | |
|---|---|---|---|
| AU | 2003-256246 A8 | | 11/2003 |
| AU | 2002-337621 A1 | | 3/2004 |
| AU | 2002-337621 B2 | | 11/2008 |
| BR | 0215860 A | | 7/2005 |
| CA | 2496377 A1 | | 3/2004 |
| CA | 2496377 C | | 9/2009 |
| CN | 1668513 A | | 9/2005 |
| CN | 100503391 C | | 6/2009 |
| DE | 60214443-D1 | | 10/2006 |
| DE | 60214443 T2 | | 3/2007 |
| DE | 602006009419-D1 | | 11/2009 |
| EP | 0255494 A1 | | 2/1988 |
| EP | 0764621 A2 | | 3/1997 |
| EP | 0764621 A3 | | 3/1998 |
| EP | 1534607 A1 | | 6/2005 |
| EP | 1534607 B1 | | 8/2006 |
| EP | 1811008 A2 | | 7/2007 |
| EP | 1956950 A2 | | 8/2008 |
| EP | 1956950 B1 | | 9/2009 |
| EP | 1811008 A3 | | 12/2009 |
| ES | 2271336 T3 | | 4/2007 |
| FR | 2374840 A | * | 8/1978 |
| JP | 62-146427 A | | 6/1987 |
| JP | 09-118581 A | | 5/1997 |
| JP | 02-049613 A | | 2/2002 |
| JP | 2002-363544 A | | 12/2002 |
| JP | 03-140116 A | | 5/2003 |
| JP | 03-218715 A | | 7/2003 |
| JP | 05-035025 A | | 2/2005 |
| JP | 2005-537999 A | | 12/2005 |
| JP | 04105162 B2 | | 6/2008 |
| JP | 2009-515785 A | | 4/2009 |
| KR | 10-0877454 B1 | | 1/2009 |
| MX | PA05002375 A | | 9/2005 |
| UA | 79011 C2 | | 5/2007 |
| WO | WO-03-093402 A2 | | 11/2003 |
| WO | WO-03-093402 A3 | | 11/2003 |
| WO | WO-2004-022450 A1 | | 3/2004 |
| WO | WO-2007-059122 A1 | | 5/2007 |
| WO | WO-2007-059151 A2 | | 5/2007 |
| WO | WO-2007-059151 A3 | | 9/2007 |

\* cited by examiner

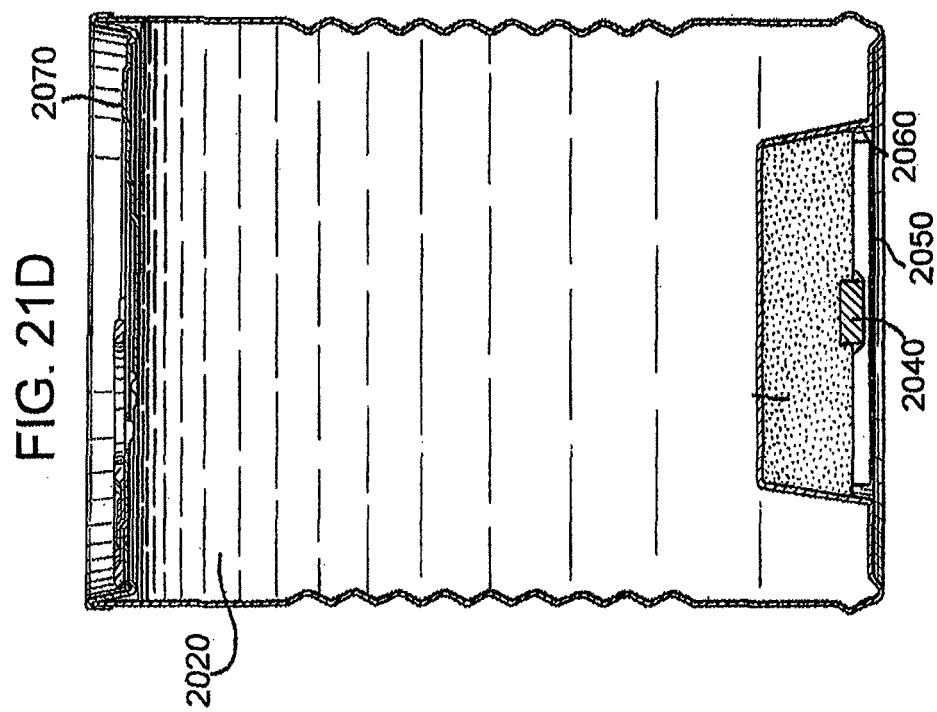
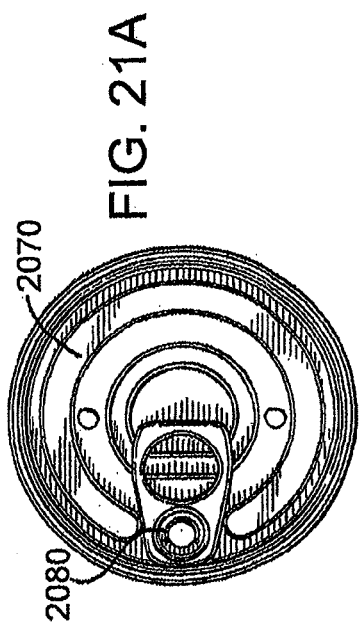
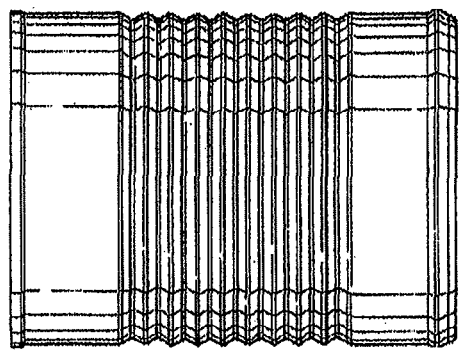
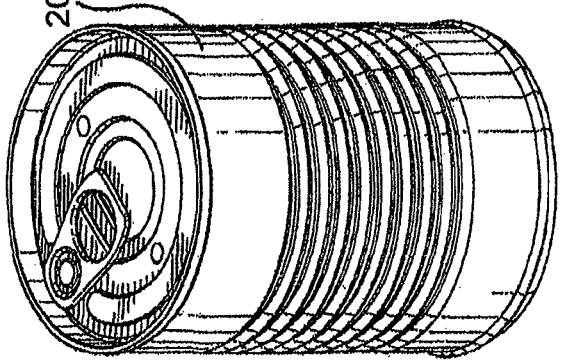

PACKAGE HEATING DEVICE AND CHEMICAL COMPOSITIONS FOR USE THEREWITH

CROSS-REFERENCE TO RELATED APPLICATIONS

This non-provisional patent application claims priority to U.S. Provisional Patent Application No. 61/361,909, filed on Jul. 6, 2010, entitled "PACKAGE HEATING DEVICE AND CHEMICAL COMPOSITIONS FOR USE THEREWITH", which is hereby incorporated herein by reference in its entirety.

TECHNICAL FIELD

This disclosure relates to precisely controlled exothermic solid state reaction compositions and incorporation of those compositions into a heating device for various applications such as heating of prepared foods or beverages in their containers.

BACKGROUND OF THE INVENTION

Situations arise in which it would be convenient to have a distributed means of providing heat in circumstances where heating appliances are not available. For example, producers of prepared foods have indicated that there could be significant market potential for self-heating food packaging (SHFP) systems that could heat prepared foods in their containers to serving temperature, simply, safely, and efficiently.

For a mass consumer SHFP product, safety is paramount and should be inherent; preferably there should be no exposure of users to extreme temperatures, no fire, and no smoke or fumes under anticipated use and abuse conditions. Practical considerations mandate that any system be reasonably compact and lightweight with respect to the food to be heated. Thus, the system should have a good specific energy and high thermal efficiency. The system must also be capable of extended storage without significant loss of function or accidental activation of the heater. There should be some simple means of activating the heater, after which the required heat load should be delivered efficiently within a specified time period or about one to four minutes. Operation must be very reliable with low failure rates in millions of units of production. For a single use food application, material components should be food-safe, low-cost, environmentally friendly and recyclable.

The only SHFP technology currently in the general consumer market uses an onboard system for mixing separated compartments of quicklime and water, yielding an exothermic heat of solution. These products are bulky (literally doubling package size and weight), complex, unreliable, costly, and have achieved very low market penetration. There have also been reported instances of the heater solution leaking and coming into contact with food or consumers.

An exothermic reaction in which the component reactants could be premixed yet be inert until such time as the user initiates the reaction would be beneficial in terms of providing for a simpler, more compact, and low cost package design. A solid state reaction system could offer advantage over wet chemical systems since solid systems will be less prone to spill or leak.

While various solid state reactions can be considered, one exemplary solid state reaction is appropriately moderated thermite reactions. Thermites are a class of exothermic solid-state reactions in which a metal fuel reacts with an oxide to form the more thermodynamically stable metal oxide and the elemental form of the original oxide. Thermites are formulated as a mechanical mix of the reactant powders in the desired stoichiometric ratio. The powders may be compressed into a unitary mass. These compact reactions generate substantial thermal energy. However, thermite reactions typically require high activation energy and thus thermite reagent compositions can be formulated to be quite stable against inadvertent initiation due to electrostatic shock or mechanical impact. This generally inert character is an advantage in storage and transportation. Solid state thermite reaction formulations may also be formulated to yield precisely moderated reaction characteristics with a controlled solid flame front speed of less than 1 mm per second. Such moderated thermite formulations have negligible gas reaction products and could be readily integrated into heating device to achieve safe and efficient heating of the contents of a container within about one to four minutes.

Given certain preferred characteristics, other non-thermite kinetically moderated solid state reaction systems, such as moderated reaction compositions of iron powder fuel mixed with a strong oxidizer, are also suitable for self-heating applications. Preferred reaction systems would be comprised of premixed solid state reactants with high heats of reaction so as to yield compact high energy content devices that are inert and stable until deliberately activated.

Further, although once activated the energy-releasing chemical reaction may produce reaction intermediates in gas or liquid form, it would be preferable that the principal final products of the solid state reaction composition be solid materials, so that there is not undesirable volume expansion or pressure generation. Such solid state reaction systems, which would generate negligible gas reaction products, would also be amenable to being hermetically sealed into heating devices so as to fully contain any emissions, smoke, or odors that do occur, if a facile means of activating the sealed heating device can be provided.

The heaters that incorporate the solid state reaction system should be easily integrated into heating devices that provide for thermal product safety under anticipated use and inadvertent misuse by consumers.

SUMMARY OF THE INVENTION

In addition to the chemical composition aspects, package heating device and related aspects are provided.

According to a particular aspect, a heating device is provided comprising a heating chamber defining an interior space for receiving and storing a substance to be heated, a reaction chamber disposed within the heating chamber, a solid state reaction composition disposed within the reaction chamber such that it is physically isolated from and in thermal communication with the interior space of the heating chamber, and an activation mechanism. The activation mechanism is in communication with the composition disposed within the reaction chamber and the reaction composition is inert until the activation mechanism is actuated.

According to another aspect, an activation mechanism is provided for a heater containing a solid state chemical composition. The activation mechanism comprises an actuator having a user interface portion and an actuation portion. The actuation portion carries a reaction initiation material that, when assembled with the heater, is capable of initiating a chemical reaction in the chemical composition when the actuation portion is actuated by a user.

According to yet another aspect, a heater is provided for use as a source of heat to heat a substance in a heating device.

The heater comprises a housing defining an exterior shape of the heater and an interior space, a solid state chemical heating composition disposed within the interior space, and an activation mechanism in communication with the composition and having an actuator disposed within the housing such that the actuator is actuable exteriorly from the housing. The heater may be incorporated into the heating device, or may be modular and removably coupled to heating device. The heater can also be fully sealed for emission-free operation, as well as to assure a controlled internal environment and to promote stability during storage.

According to yet another aspect, various passive and active thermal controls based on physical or chemical responses of materials to temperature and appropriate to important use conditions for heating device are provided.

Other aspects will be apparent to those of ordinary skill in the art.

BRIEF DESCRIPTION OF THE DRAWINGS

To understand the present invention, it will now be described by way of example, with reference to the accompanying drawings in which:

FIG. 6 is a perspective cross-sectional view of the modular heater embodiment in

FIG. 5;

FIG. 21A is a top view of an alternative embodiment of a heater package design in accordance with the present invention;

FIG. 21B is a perspective view of the embodiment of FIG. 21A;

FIG. 21C is a side view of the embodiment of FIG. 21A.

FIG. 21D is a side cross-sectional view of the embodiment of FIG. 21A; and

DETAILED DESCRIPTION OF EXEMPLARY EMBODIMENTS

Figure 1:
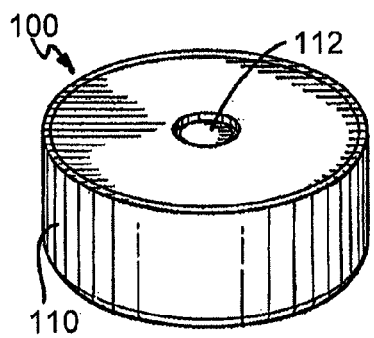
FIG. 1 is a perspective view of a particular embodiment of a modular heater.

The description that follows describes, illustrates and exemplifies one or more particular embodiments of the present invention in accordance with its principles. This description is not provided to limit the invention to the embodiments described herein, but rather to explain and teach the principles of the invention in such a way to enable one of ordinary skill in the art to understand these principles and, with that understanding, be able to apply them to practice not only the embodiments described herein, but also other embodiments that may come to mind in accordance with these principles. The scope of the present invention is intended to cover all such embodiments that may fall within the scope of the appended claims, either literally or under the doctrine of equivalents.

It should be noted that in the description and drawings, like or substantially similar elements may be labeled with the same reference numerals. However, sometimes these elements may be labeled with differing numbers, such as, for example, in cases where such labeling facilitates a more clear description. Additionally, the drawings set forth herein are not necessarily drawn to scale, and in some instances proportions may have been exaggerated to more clearly depict certain features. Such labeling and drawing practices do not necessarily implicate an underlying substantive purpose. The present specification is intended to be taken as a whole and interpreted in accordance with the principles of the present invention as taught herein and understood to one of ordinary skill in the art.

Food safety and cost are two primary considerations in the selection of potential materials for use in the illustrative embodiments described herein. The reaction systems described in this application involve only abundant, low-cost, food-safe materials and are therefore in this regard good candidates for SHFP. However, those of ordinary skill in the art will understand that many different materials could be selected without departing from the novel scope of the present invention.

One solid state reaction system that may be used in the present invention is thermite reactions wherein the reaction of a metal fuel with one or more oxides to form the more thermodynamically stable metal oxide and the elemental form of the original oxide(s) is appropriately moderated to give a combustion wave speed of much less than $1\ m\ s^{-1}$. Factors that can be altered to adjust the reaction rate and combustion temperature of solid state systems include: particle size of reactants, composition, diluent (inert) additives, pre-combustion density, ambient pressure and temperature and physical and chemical stability of reactants.

The principles of the present invention may also be applied by using alternative solid state reaction systems for generation of thermal energy. One potential advantage of alternative reaction systems over thermites is a lower activation energy such that reaction can be sustained at lower temperatures. One such reaction system is the complete reaction between the fuel iron powder and an oxidizer which is a chlorate of sodium or potassium in stoichiometric balance. This reaction system yields the generally benign products iron oxide and sodium chloride, and releases a high specific energy content of $3.98\ kJ\ g^{-1}$. The iron/sodium chlorate reaction has excellent shelf life stability prior to activation. These properties make it a preferred solid state reaction system for use with the heating application of the present invention.

A common commercial use of the iron/sodium chlorate chemical reaction is in chemical oxygen generators (often referred to as "oxygen candles") that are used in commercial aircraft to provide emergency oxygen to passengers in the event of reduced cabin pressure. In oxygen candle applications, the molar or mass ratio of iron to chlorate is deliberately kept very low (2 to 6 weight percent). In such formulations, all of the oxygen will not be consumed in oxidation of the iron but rather when the mixture is ignited; a smoldering reaction releases about 6.5 man-hours of oxygen per kilogram of the mixture at a steady rate, in addition to sodium chloride and iron oxide byproducts.

Prior art oxygen candles are optimized for the most efficient volumetric generation of oxygen by carefully balancing iron oxidation by chlorate to generate heat just sufficient to sustain endothermic decomposition of the excess chlorate. Other functional additives may be added to the formulation, but always in minimal quantities to maximize the volumetric oxygen content of the system.

An iron-chlorate reaction may be used for an enclosed heat generation system as contemplated herein by modifying the prior art oxygen candle. For use with the present invention, the oxygen, rather than being emitted externally to the device, is fully reacted internally in the heating device to a solid oxide. One means to accomplish the complete capture of oxygen is to adjust the stoichiometry of the reaction mixture to include a second fuel component (for example, more iron powder) that reacts with the oxygen as it is generated.

Increasing the catalytic iron content of the reaction mixture over that described in prior art oxygen candle technology will significantly increase the rate of chemical reaction while simultaneously increasing the thermal energy output per unit mass of mixture; such conditions can lead to autocatalytic thermal runaway. In order to provide appropriate moderation of the chemical reaction temperature and rate, a significant portion of an inert thermal diluent may be added into the reaction composition, as well as other functional additives to improve the processing or performance of the formulation.

It is generally desirable for the heating applications contemplated herein to optimize heat generation with the minimal net gas generation. Thus, the mass loading of iron fuel component relative to the oxidizer chlorate in the composition is substantially increased so that oxygen released is largely consumed simultaneously. Other oxygen consuming materials may also be added. When formulated in this way, substantially more heat will be released as reactions proceed, and substantially more thermal diluent is incorporated in the system relative to prior art chlorate candles to moderate temperature to practically suitable levels. Diluents may include inert oxides such as silicas, aluminas, clays, or other. The particle sizes of the materials and other reaction conditions are also formulated to provide for faster reaction such that all the heat is released within about one to four minutes rather than over extended periods of 10 minutes or more.

Table 1 describes various moderated iron-chlorate reaction compositions that may be used with the present invention. All of the example formulations have stoichiometric ratios of iron fuel to oxidizer of 1:1 or higher, as well as a high loading of an inert thermal diluent (alumina). The iron fuel is preferably in the form of a powder with particle sizes ranging from 3 to 40 microns and the sodium chlorate is preferably finely milled prior to mixing and compacting the formulations into a heater canister. Fuel to oxidizer ratios of slightly greater than 1:1 are preferred for the most efficient consumption of free oxygen, most preferred is a ratio of about 1.1 to 1. All of the example formulations have negligible free gas generations as well as solid flame front speeds of less than 1 mm per second. This reaction rate constant corresponds to a heating time of about one to four minutes and a delivered energy content in excess of 0.8 to $1.2\ kJ\ g^{-1}$ of the reaction mixture when incorporated into the heating device and apparatus of the current invention.

TABLE 1

Examples of Moderated Iron-Chlorate Reaction Compositions

| Component | I. wt. % | II. wt. % | III. wt. % | IV. wt. % |
|---|---|---|---|---|
| NaClO$_3$ | 13.9% | 13.3% | 12.7% | 27.2% |
| Fe | 14.6% | 15.3% | 16.0% | 31.4% |
| BaO$_2$ | 1.3% | 1.2% | 1.1% | 1.2% |
| Al$_2$O$_3$ | 70.0% | 70.0% | 70.0% | 40.0% |
| Ceramic Fibers | 0.2% | 0.2% | 0.2% | 0.2% |
| Fuel to oxidizer ratio | 1:1 | 1.1:1 | 1.2:1 | 1.1:1 |

As an alternative to directly incorporating the full complement of solid fuel into the reaction mixture, additional oxygen-reactive fuel mass such as porous iron could be disposed adjacent to a sub-stoichiometric iron-chlorate mixture inside the heater such that all of the oxygen released by the chlorate is still reacted into solid oxide products and consumed internally. In this alternative, there is no net production of gas to cause pressure build up or emissions from the device.

The iron chlorate reaction is not a true thermite system. However, similar to the moderated thermite compositions described previously, it includes a powdered metal fuel, a strong oxidizer, and a thermal diluent. While the foregoing discussion describes sodium chlorate, potassium and lithium chlorate, and sodium, potassium and lithium perchlorates, or other inorganic chlorates, perchlorates, or super-oxides can also be used to fully or partially substitute. Similarly, solid fuel materials other than iron that produce solid oxides may also be used.

The reaction kinetics may be more precisely adjusted by using, for example, a mixture of sodium and potassium chlorates, thus utilizing their distinctive thermal decomposition properties. Other chlorates or oxidizing components may also be included in the formulation. Other functional additives may also be used and are considered within the scope of the invention. For example, barium peroxide can be used to absorb free chlorine generated by decomposition of the chlorate.

Preferred moderated solid state reaction systems for the heating device of the present invention are amenable to inclusion in heater structures that encapsulate the materials while permitting efficient transfer of heat from the heater. A still further aspect of the present invention is integration of a heater comprised of a solid state chemical composition and an activation mechanism into the packaging of a food product to be heated by a consumer. An appropriate design of package can be used in conjunction with the moderated composite fuel formulation to provide for ease of use and additional consumer safety.

Increased weight and volume of packaging relative to the net food content translates to higher shipping costs and shelf space requirements. Therefore, in order to keep packaging overhead low, a compact SHFP heater is preferred. However, a compact geometry means less surface area is available for heat transfer, which is an important consideration where the food to be heated is not readily stirred to provide convective heat transfer. Conductive heat transfer from a small heater to a larger mass of solid or non-stirrable food material will provide inefficient and uneven heating.

In order to overcome these limitations, the heater as contemplated by the present invention may be implemented so that the heat it generates raises steam that distributes throughout the package interior and transfers sensible and latent heat (via condensation) to the food. For this purpose, a small quantity of water is maintained in contact with the outer surface of the heater. For example, a heater structure could be in contact with a water absorbent material or a liquid water reservoir in the base of the package. The combustion characteristics of the heater are designed so that in operation, the exterior surface of the heater maintains a temperature sufficient to vaporize water to steam.

The principles of the invention can be applied to provide a modular heater, such as one embodiment of a modular heater 100 as shown in FIG. 1, which can be provided in numerous forms and incorporated into a variety of devices, containers, or the like to provide a source of heat. In the embodiment shown in FIG. 1, the modular heater 100 has a form in a general cylinder or disc shape. While other shapes are contemplated, the general cylinder or disc shape is particularly suitable for manufacturing as well as integration into container and packaging forms generally available in the food and beverage industry, such as, for example, soup cans, beverage containers, "instant" or "travel" style food container forms, or the like. The heater 100 includes a housing 110 and an activation mechanism 112, which provides activation of the heater 100 and initiates production of heat by a chemical reaction in accordance with the principles of the present invention.

Figure 2:
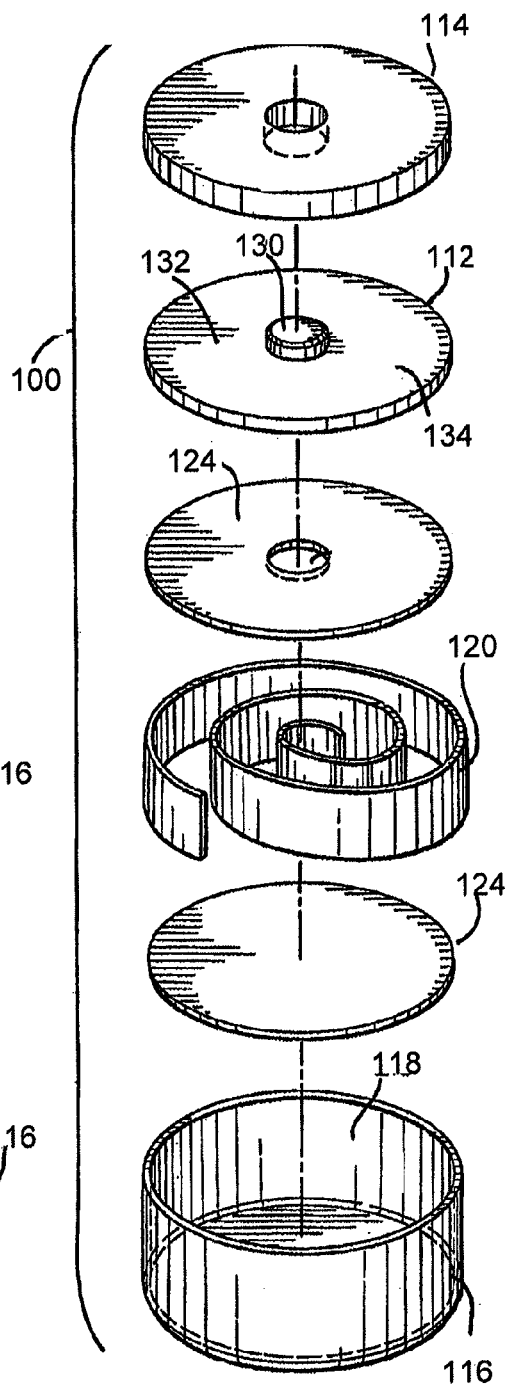
FIG. 2 is an exploded assembly view of the modular heater depicted in FIG. 1.
Figure 3A:
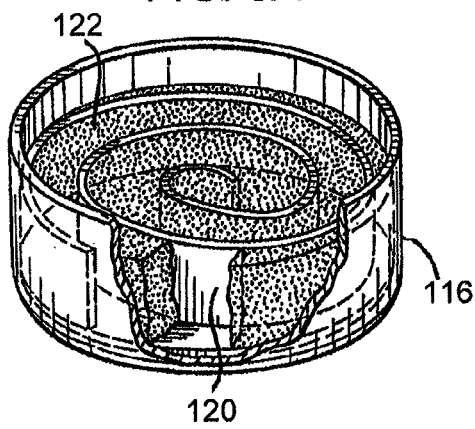
FIG. 3A is a perspective breakaway view of the modular heater of FIG. 1 having the lid, inert material layer, and activation button removed.

One embodiment of a heater is shown in the exploded assembly view of FIG. 1, the housing 110 of the heater 100 preferably includes a lid 114 and a canister portion 116, which define an exterior shape of the heater 100 and an interior space 118. In this particular embodiment, a reaction regulator element 120 is disposed within the canister portion 116 such that when the canister portion 116 is filled with a solid state chemical heating composition 122, as shown in FIG. 3A, the reaction regulator element 120 is embedded within the composition 122 to define a reaction path. As shown in FIGS. 2 and 3A, the reaction regulator element 120 has a spiral-like shape defining a spiral-like reaction path. However, other geometries can be employed as well to define various path shapes, lengths and thicknesses, and are contemplated in accordance with the principles of the invention. In addition to adjustment of variables within the composition, such as for example, particle shape and size, composition ratios, etc., the reaction regulator element 120 can be optimized to impart desired regulation and control over the reaction or burn path and rate of reaction, and hence, burn time, within the composition 122. For example, the spiral-like shape of the reaction regulator element 120 has been shown to provide a consistent and more regular burn pattern emanating from the center of the disc-like shape to which the composition 122 has been formed. In a preferred embodiment, the reaction regulator element 120 is made of a thin metal strip, such as steel, however, numerous other materials may be employed that are suitable to effectively perform the function of defining a reaction path with the given composition.

Figure 3B:
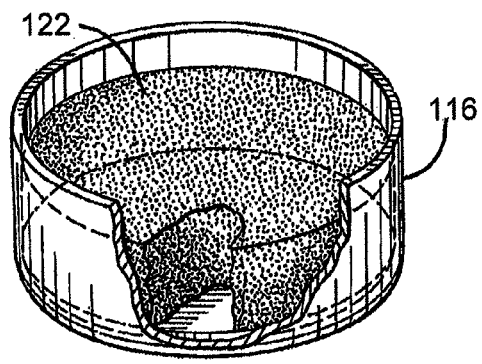
FIG. 3B is a perspective breakaway view of an alternate embodiment of the modular heater of FIG. 1 that does not utilize a reaction regulator element, the view of the embodiment shown without the lid and inert material layer.

While embodiments incorporating the reaction regulator element 120 may be desirable in certain applications, it is to be understood that it may be desirable in some applications to forego use of the reaction regulator element 120, particularly in cost sensitive applications. Furthermore, as already noted above, burn rates and paths, and heat generation rates may be optimized via adjustment of variables within the composition, such as for example, particle shape and size, composition ratios, etc. In such embodiments, the reaction composition 122 is disposed within the canister portion 116 as shown in FIG. 3B, wherein the reaction would initiate generally in a central portion of the reaction composition 122 and propagate generally radially outward therefrom. It should be understood that the embodiment illustrated in FIG. 3B may be employed in connection with any of the descriptions herein with respect to embodiments incorporating the reaction regulator element 120 (such as that illustrated in FIG. 3A), and accordingly should not be excluded from consideration in connection with such descriptions.

Figure 4:
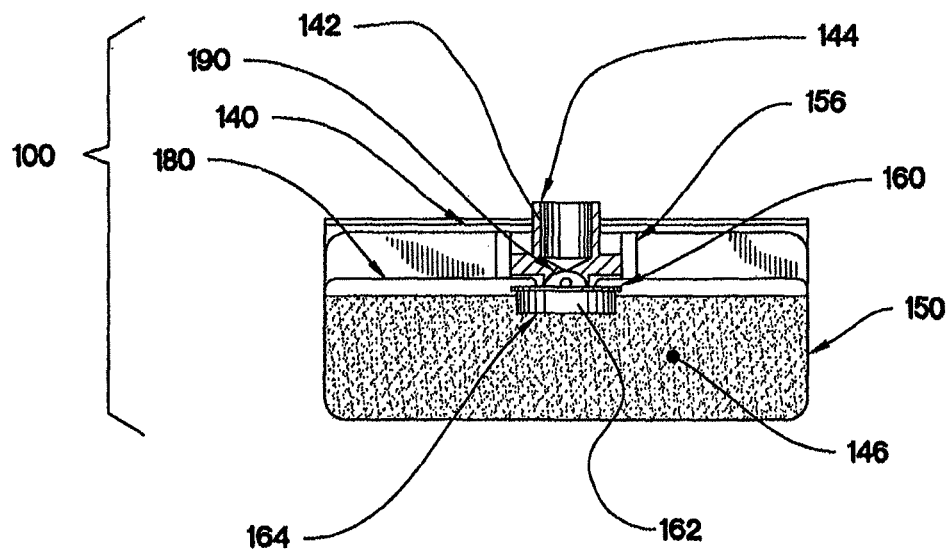
FIG. 4 is a cross-sectional view of another embodiment of a modular heater.

FIG. 4 shows another preferred embodiment of a heater 100 with a solid lid 140 having a central opening 142 through which an actuator in the form of a plunger 144 is pushed by the user. The actuator is part of an activation mechanism, which may include bearing surfaces 156 to guide the plunger or limit its travel. To effect activation of the solid reaction mixture 146, the plunger 144 coupled to the canister 150 is capable of mechanical movement into the interior. The activation mechanism includes a blister 160 formed of foil or other material pierceable by plunger 144. The blister 160 is partially filled with a small quantity of a starter fluid that will rupture under applied pressure such that the fluid is expelled onto an absorbent material 162 and then transmitted to a formed starter pellet 164 comprised of a chemical mixture that will react with the fluid contained in the blister 160. The starter pellet 164 is embedded into the surface of the solid state reaction mixture 146. The starter fluid and pellet 164 together constitute a spontaneous highly exothermic chemical reaction couple that generates sufficient thermal energy to initiate the main solid state reaction. The components just described act together to effectively act as a push-button activation mechanism such that when the plunger 144 is pressed by a user, it initiates a sequence leading to a precursor chemical reaction between the fluid expelled from the blister 160 and the chemical mixture in the pellet 164 that generates intense localized heat that initiates reaction of the solid state reaction mixture 146 and heat generation. An interior structural component 180 may be used to maintain the position of the blister 160 in the center of the heater 100 and in contact with the starter pellet 164, while also creating an air gap around the pellet 164 that facilitates dissipation of the gaseous products of the starting reaction. For greatest reliability, some means of assuring that rupture of the blister 160 occurs in the center of its surface in contact with the absorbent 162 is preferentially included. For example, a ball bearing 190, preferably about 1-2 mm in diameter, may be included in the interior of the blister 160 to act as a centrally directed force concentrator.

For certain embodiments of the heater device, it may be acceptable or desirable to provide a passage or vent to allow any gas that may result from the chemical reaction to escape from the heater housing. In such embodiments, a gas "valve" or vent can be formed into the housing. In the embodiment shown in FIG. 4, the gaps between the central opening 142 in the solid lid 140 and the plunger 144 effectively constitute such a vent opening, as may also be realized by any unsealed gaps between the lid 140 and the canister 150. Prior to activation, the gap between the plunger 144 and the lid 140 could be sealed by an adhesive that releases when sufficient pushing force is applied, but this seal may be broken by the relative motion between the plunger 144 and the lid 140 that transmits operation of the activator mechanism into the interior of the heater.

Figure 5:
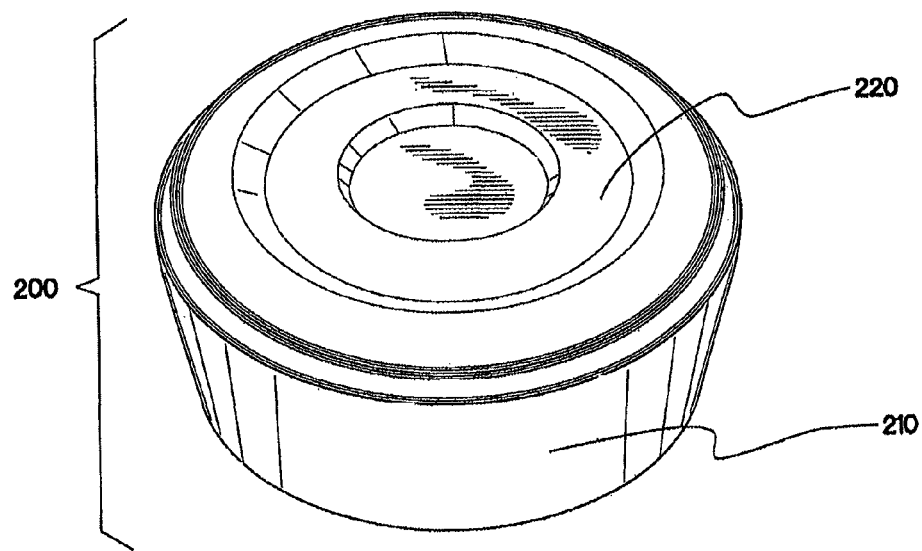
FIG. 5 is a perspective view of an embodiment of a fully sealed modular heater.

Alternatively, the principles of the invention can also be applied to provide a modular heater which is fully sealed, such as the embodiment of a modular heater 200 shown in FIG. 5, which can be provided in numerous forms and incorporated into a variety of devices, containers, or the like to provide a source of heat. A number of benefits are provided when the heater is fully sealed. For example, if the reaction components or any of the internal components of the heater are potentially affected by changes in external ambient factors such as humidity, complete sealing of the heater, such as through hermetic sealing, can be used to assure a controlled internal environment and promote stability during storage. This may be particularly beneficial if the heater must pass through high temperatures and pressures in food sterilization processing. For heater use by consumers, and particularly in association with food heating applications, it is beneficial to assure that chemical components of the heaters are fully sealed against potential contact with the user or food. A fully sealed heater can potentially be operated immersed in the substance to be heated without contamination concerns.

Sealing of the heater can also eliminate smoke, fume, or odor emissions from the operating heater after activation for a more favorable user experience. As described previously, in order to facilitate encapsulation into a sealed heater, the solid state reaction systems of this invention are formulated to produce little or no gaseous reaction products. To further reduce potential gas generation in the device and facilitate sealing, the reaction materials may also be dried during processing to drive off water and other volatiles. Non-combustible materials of construction with low tendency toward outgassing may also be preferred for other internal components of the heater.

Figure 6:
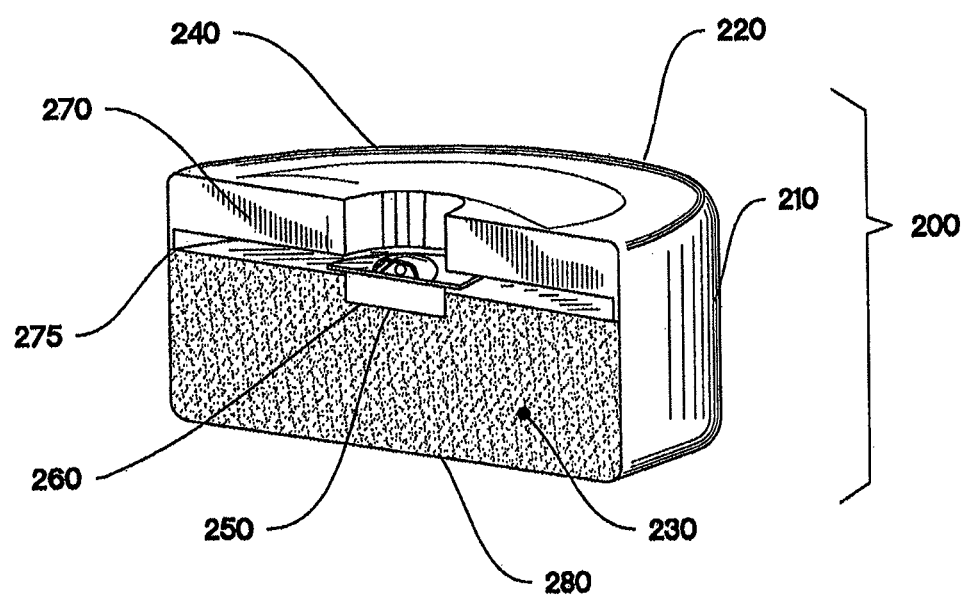

In accomplishing sealing of the heater, a means to activate the solid state reaction in a simple but reliably effective manner must be accomplished. The solid fuel should not be prone to inadvertent activation, yet the heater should incorporate a simple means of activating the reactive material in the heater at the desired time of use. FIGS. 5 and 6 show an embodiment of heating device that achieves the simultaneous objectives of a sealed heater that can easily be activated. FIG. 5 shows a perspective view of the heater 200, which composes a canister 210 and a flexible lid 220.

In FIG. 6, another preferred embodiment of a heater 200, canister 210 contains a layer of the solid state reaction mixture 230. The activation mechanism preferably comprises the following components: (1) a flexible lid 220 coupled to the canister 210 that is capable of mechanical deflection into the interior, (2) a piston 240 positioned adjacent to the interior surface of the flexible lid 220, (3) a blister 250 formed of foil or other material rupturable by piston 240, the blister 250 positioned below piston 240 and being partially filled with a small quantity of a reaction initiation material or "starter fluid" that will rupture under applied pressure such that the fluid is expelled onto (4) a formed starter pellet 260 comprised of a chemical mixture that will react with the fluid contained in the blister 250, the starter pellet 260 embedded into the surface of the solid state reaction mixture 230. It should be understood, however, that various modifications, substitutions or omissions may be employed without departing from the scope and function of the present invention. The starter fluid and pellet 260 together constitute a spontaneous highly exothermic chemical reaction couple that generates sufficient thermal energy to initiate the main solid state reaction. All of the components described act together to effectively act as a push-button activation mechanism such that when the center of the lid 220 is pressed by a user, it initiates a sequence leading to a precursor chemical reaction between the fluid expelled from the blister 250 and the chemical mixture in the pellet 260 that generates intense localized heat that initiates reaction of the solid state reaction mix 230 and heat generation. Heater 200 may also comprise a thermal resistance layer 270. All of the materials and components disclosed herein, as well as the simple, robust construction of the heater 200, provide for low cost, high volume manufacture.

One preferred exothermic starter reaction couple which can be configured to reliably generate very high temperatures with minute quantities of reagents for use in the activation mechanism is potassium permanganate (or other strong oxidizer) in the starter pellet 260 in conjunction with a glycerin, glycerol, glycol or other liquid polyalcohol as the starter fluid. In a preferred embodiment, approximately 2-20 µl, and more preferably approximately 10 µl, of fluid is encapsulated in the blister 250. In the case of glycol and other similar compounds, such amounts minimize carbon dioxide gas generation from the initiation reaction and hence pressure build-up in the heater 200.

A preferred embodiment of blister 250 is constructed to provide for stable retention of the starter fluid, and consists of a formed pocket in a foil laminate (or other similar material rupturable by piston 240) that, after filling with starter fluid, is sealed with an adherent thin foil (or other suitable material) seal. The foil seal is configured to be the surface that ruptures under applied force by piston 240 to release the started fluid. The foil seal may be laser scribed to reduce the force required for it to rupture. For greatest reliability, the majority of the starter fluid in the blister 250 should be delivered in a reproducible manner onto the center of the starter pellet 260. Alternatively, small mechanical piercing elements that are internal or external to the blister 250 may also be incorporated into the activator mechanism in order to facilitate uniform, targeted fluid delivery characteristics.

The permanganate starter pellet 260 may additionally contain small additions of solid fuel materials such as metal powders to increase the heating effect. In order to increase the reliability of the starting reaction, the starter pellet 260 may also contain a few percent by weight of fibrous particulates such as fiberglass or ceramic fibers to promote wicking and rapid absorption of the starting fluid. In order to further increase reliability of the starting reaction, particularly such that the heater can be initiated in any orientation, a thin layer of an absorbent material such as cellulose, filter paper, or fiberglass mat may be interposed between the blister 250 and the starter pellet 260 to capture, and then transmit to the pellet 260, the starting fluid expelled from the blister 250.

The continuous, impermeable, flexible metal diaphragm structure of the flexible lid 220 is similar to the pop-up indicators in food jar lids that show whether the vacuum seal has been broken, but may have additional functionality specific to the heater 200. The force required to deflect the flexible lid 220 can be calibrated to be sufficiently low for finger pushing operation by a typical user but not so low as to lead to inadvertent activation of the heater 200; thus the force required may be for example in the range of two to five pounds. The flexible lid 220 is preferably engineered to give a specific reproducible displacement of its center so as to always cause the proper compaction of the blister 250. When appropriate force is applied to the center of the lid 220, it pushes the piston 240 through a deflection distance (approximately 2 mm in a preferred embodiment) and effects the force needed to puncture the blister 250 and expel the starting fluid onto the pellet 260. In a preferred embodiment, the piston 260 may be a stamped metal part affixed to the interior surface of the flexible lid 220; other structures which may be suitably held in place would also be effective. The piston 260 has low thermal mass such that it does not draw substantial heat energy from the activation region.

For most effective heat transfer when installed in the heating device, the closed end of the canister 210 adjacent to the solid state reaction mixture 230 will be oriented so as to be nearest to the vessel or substance being heated. Materials and structures that resist the flow of heat preferentially occupy the interior space of the heater 200 between the solid state reaction mixture 230 and the activation mechanism. In one embodiment, an interior band of space 275 may be formed of one or more walls or baffles, insulating air gaps, or layers of insulating materials. Band preferably spans from the top surface of the reaction mixture 230 to the bottom surface of lid 220. A thermal resistance layer 270 may also be incorporated, and is preferably adjacent to the flexible lid 220 and is preferably a compressible structure, such as a compressible fiberglass layer or ceramic mat, or otherwise constructed such that it does not interfere with actuation.

Prior to activation, the flexible lid 220 is effectively at rest in a stable "popped up" state. In a preferred embodiment, the flexible lid 220 may be engineered so that once pushed it snaps down and comes to rest in a stable "popped down" state, thus providing an audible or tactile indication that the heater 200 has been activated. In the un-activated state, the moveable central portion of the flexible lid 220 may be somewhat recessed from the outer edges so that if several heaters 200 are stacked, the flexible lid 220 is not inadvertently pushed. The mechanical design of the flexible lid 220 can be arranged such that the full operational translation of its center is only given by a centrally applied force yet not under a generally applied change in ambient pressure. This feature would permit the installed heater 200 to be passed through a pressurized retort or autoclave used to sterilize packaged foods without being activated. In an alternative embodiment (not shown), the flexible actuator panel of the sealed heater could be configured for location off-center or in a side wall of the canister.

Any of a number of known methods for sealing lids onto metal containers could be used to seal flexible lid 220 to canister 210. One appropriate sealing method is hermetic sealing. Referring again to FIG. 4, hermetic sealing can be accomplished by first firmly seating the flexible lid 220 into place on the canister 210 and then applying a crimping force to form the edge of the canister 210 over the lid 220, bringing the two metal surfaces into close contact. An airtight seal is achieved by applying a thin layer of a high temperature sealant in the joint area prior to crimping. Alternatively, the lid 220 and canister 210 may be provided with formed edges that permit sealing using conventional single or double seaming methods as is done with food cans.

Figure 7:
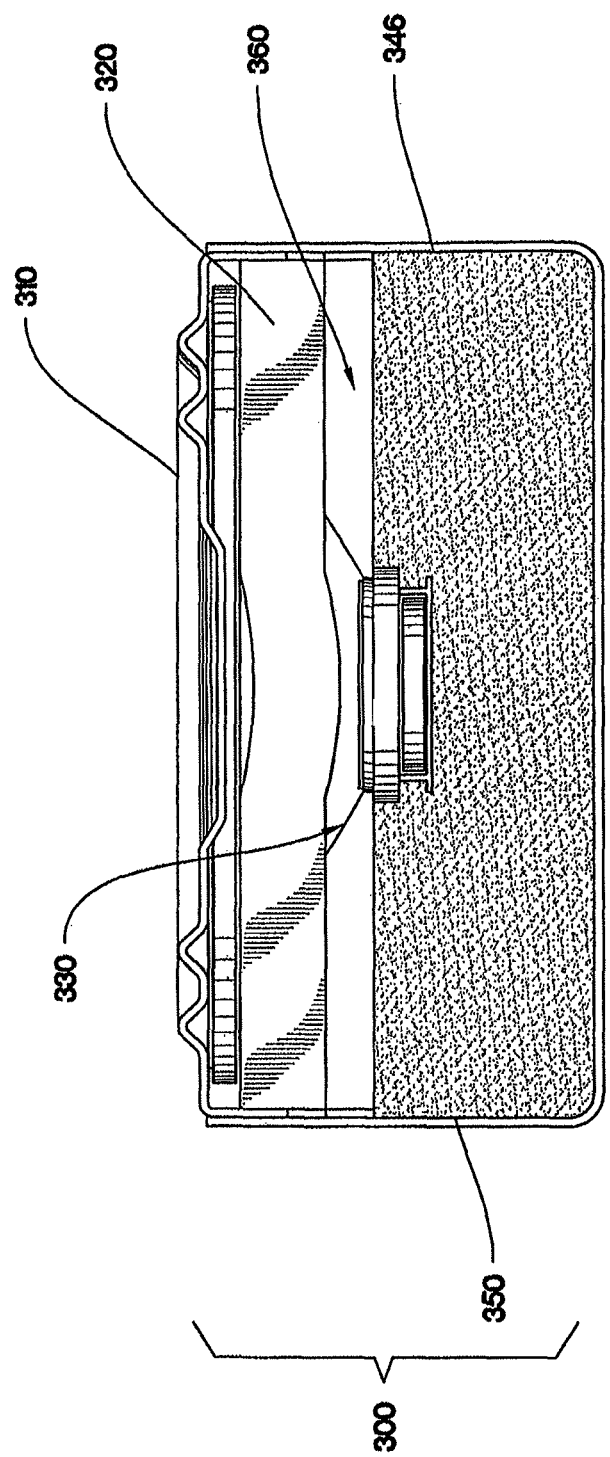
FIG. 7 is a cross-sectional view of another embodiment of a heater disposed within a container having a flexible lid and a flexible insulation layer for depressing activation mechanism and forcing a starter pellet to crush or puncture a crucible filled with reaction initiation material.

In another embodiment of a modular heater, shown in FIG. 7, the solid state reaction may be activated by a user pushing on a flexible lid 310. When the lid 310 is pushed downward, a flexible insulation layer 320, such as a ceramic or fiberglass mat, depresses a pusher 330 and forces it to crush or puncture a pellet 340 filled with a chemical mixture. A suitably firm pellet 340 or a puncturing boss (not shown) on the pellet 340 would puncture a foil (or other material) lid which forms a lid on blister 350. The activation mechanism may be recessed in an insulation layer 320, the insulation layer 320 insulating against heat conduction through the flexible lid 310. An inert spacer 360 may also be provided to allow movement of pusher 330 toward pellet 340.

Figure 8:
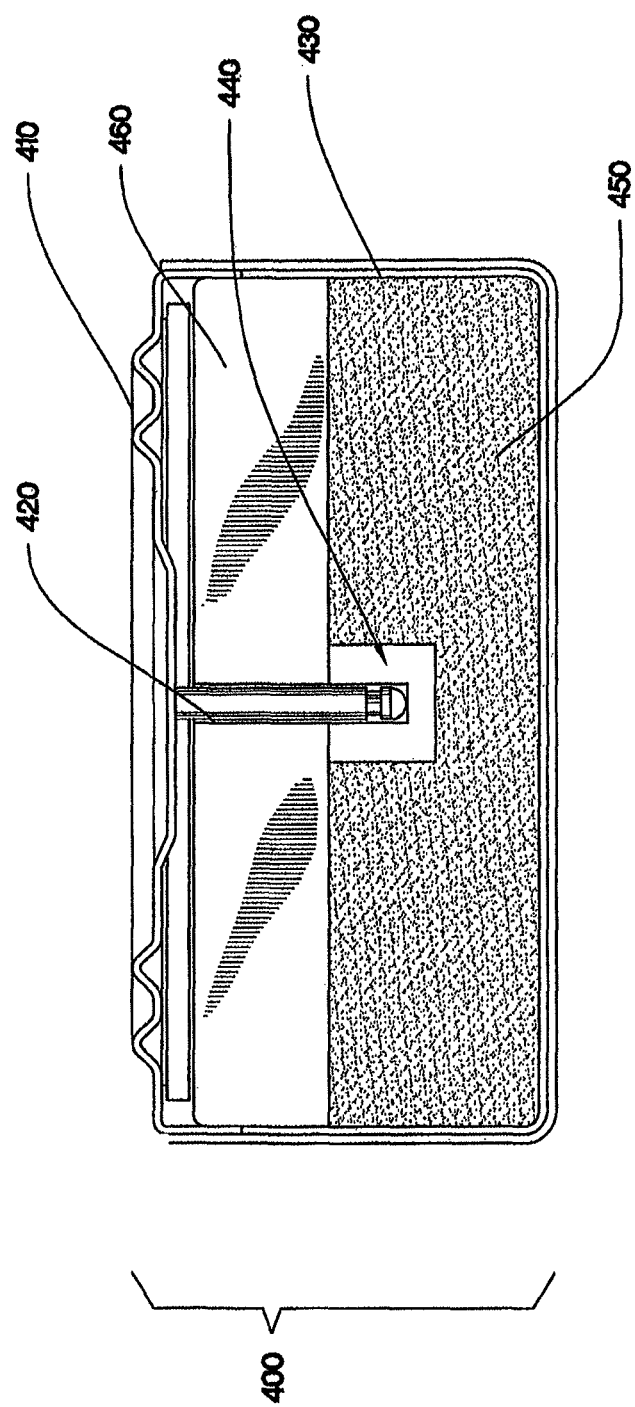
FIG. 8 is a cross-sectional view of another embodiment of a heater disposed within a container having a flexible lid for depressing activation mechanism causing a syringe piston to expel reaction initiation material to be dispensed onto the starter pellet.

Another embodiment of a modular heater 400 is shown in FIG. 8. In this embodiment, activation mechanism is comprised of a syringe piston 420 which may be actuated by a user pushing on a flexible lid 410. When the lid 410 is pushed toward the solid state chemical reaction mixture 430, the syringe piston 420 is forced downward to expel reaction initiation material contained in chamber 440 to be dispensed onto a starter pellet 450, thus initiating the solid state chemical reaction. An insulation layer 460 may be provided to insulate against heat conduction through the flexible lid 410.

Figure 9:
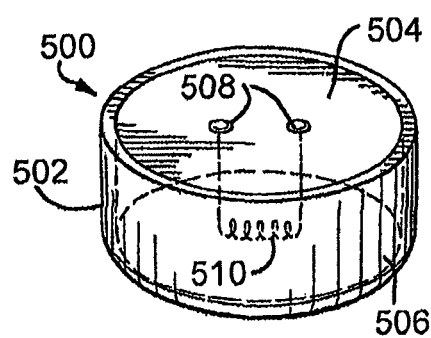
FIG. 9 is a perspective view of another embodiment of a modular heater utilizing a resistive heating activation assembly.

The modular heater can make use of any number of activation mechanisms contemplated herein. In another exemplary embodiment illustrated in FIG. 9, a heater 500 is provided utilizing a resistive heating activation concept. In accordance with this concept, the heater includes a housing 502, which further includes a lid 504 and a container portion 506, together generally defining an exterior shape of the heater 500 and an interior portion for housing a chemical heating composition as previously described. In this embodiment, heater 500 includes a pair of terminals 508 in communication with a resistive heating component 510, which is in contact with the composition, and preferably embedded therein to ensure proper activation. While capable of being utilized in any configuration contemplated herein, this arrangement is particularly suitable for use in modular applications where the heater 500 is provided for use in connection with reusable heating devices. Although not shown, application of this embodiment includes a power source, such as a battery, which provides adequate voltage to allow the resistive heating component 510 to achieve appropriate temperatures. In a particular embodiment, a starter composition may be disposed around the resistive heating component to help initiate the contemplated chemical reaction within the chemical composition. In other embodiments, a piezoelectric igniter may be utilized in a similar configuration to that illustrated in FIG. 9.

A still further aspect of the present invention is integration of a heater comprised of a solid state reaction composition and an activation mechanism into the packaging of a food product to be heated by a consumer. An appropriate design of package can be used in conjunction with the moderated solid state reaction composition to provide for ease of use and additional consumer safety. The solid state reaction composition can be integrated into a package in a way that provides for efficient transfer of the heat generated to the material to be heated. To illustrate this aspect of the invention, several illustrative embodiments describing designs for incorporating solid fuel compositions into self-heating food packaging follow.

Figure 10:
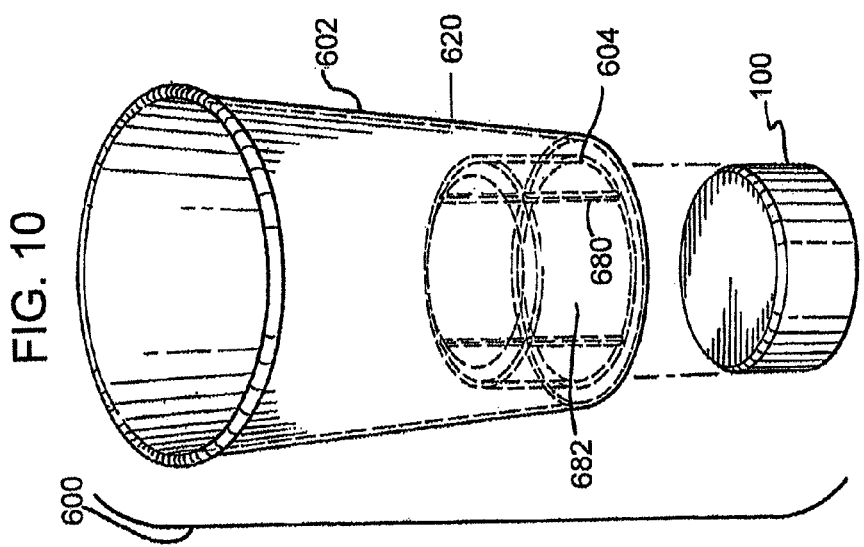
FIG. 10 is an exploded assembly view of a particular embodiment of a package heating device in the form of a beverage cup having a pocket to accommodate a modular heater.

A modular heater as described herein can be employed in a variety of contexts, including but not limited to mass produced consumer food and beverage containers. In such applications, the heater must be installed at very high production rates, yet in such a secure manner as to eliminate the potential for accidental dislodgement during use. As illustrated in FIG. 10, a package heating device 600 is provided with a beverage container 602 and a heater 100. The beverage container 602 is formed with a pocket 604 to accommodate the heater 100. For ease of illustration, only the beverage container 602 and the heater 100 are illustrated, with the understanding that other components may be included as well, such as, for example, a safety seal covering the actuator of the activation mechanism and a product seal or other product packaging requirements. The heater 100 may be configured to be press fit into the pocket 604 during a manufacturing process. In other embodiments, the heater 100 may be adhered or otherwise suitably secured to the beverage container 602. The heater 100 may alternatively be fully integrated with the beverage container 602. In another alternative embodiment (not shown), a fully sealed heater, such as that shown in FIGS. 5 and 6, may also be coupled to beverage container 602.

Figure 11:
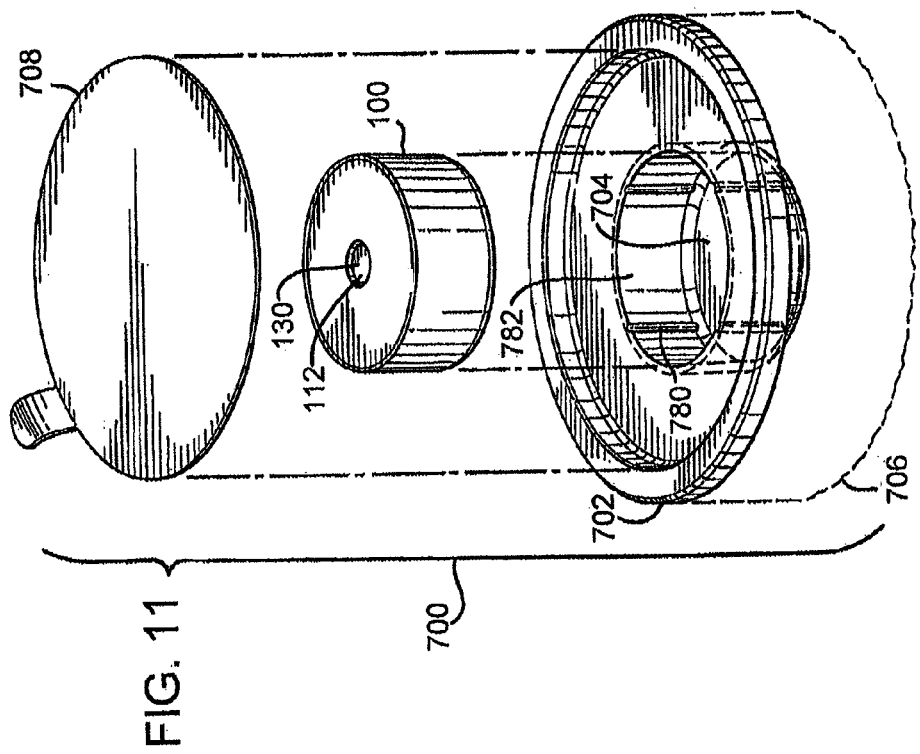
FIG. 11 is an exploded assembly view of a particular embodiment of an end portion of a package heating device having a pocket to accommodate a modular heater and a safety seal.

FIG. 11 illustrates another exemplary package heating device 700, which is particularly suitable for canned food items, such as soup or chili. In this embodiment, a container end 702 is provided with a pocket 704 configured to accept the heater 100. The container end 702 is designed to be formed onto a container cylinder 706 (partially shown in phantom line) to form a bottom portion of the heating device 700. Thus, the heater 100 is disposed on the bottom of the heating device 700. A safety seal 708 is preferably applied to the container end 700 to cover the heater 100 and thus, the actuator 130 of the activation mechanism 112 to prevent accidental activation. With both embodiments, the heater 100 is designed such that it can be assembled to the food or beverage packaging container at any point in the manufacturing process, including before any autoclaving process, such as that typically applied in canned food processes. Furthermore, the container end 702 is designed such that it can be provided as a sub-assembly already containing the heater 100 and safety seal 708. In such an application, the container end sub-assembly can be formed onto the container cylinder 706 without the need for further assembly with respect to the heater 100. The heater 100 may alternatively be fully integrated with the beverage container end 702. In another alternative embodiment (not shown), a fully sealed heater, such as that shown in FIGS. 5 and 6, may also be coupled to beverage container end 702.

Referring again to the embodiments of FIGS. 10 and 11, each of the pockets are provided with at least one, and preferably a plurality, of respective channels 680, 780 along a respective sidewall 682, 782 of each of the pockets 604, 704. These channels 680, 780 provide a venting mechanism for air trapped between the heater 100 and the pockets 604, 704 to escape and thereby prevent expansion and pressure build during heating. Alternatively, scored channels may be formed along the sidewalls of the modular heater 100 itself in order to provide the venting mechanism. The channels 680, 780 also prevent air lock during installation of the heater 100.

Although not shown in the drawings, any of the devices, containers or packages may be configured with a reservoir in communication with the heater and in communication with the interior portion of the device, container or package that contains the substance to be heated, wherein the reservoir holds an amount of water that, upon activation of the heater, generates steam that may be used in the heating and preparation of the substance. Such a configuration would be particularly suitable for heating food items such as, for example, rice and pasta.

As noted above, the heater 100 may be a modular element, either configured to be fit into an associated pocket of a device, container or package during a manufacturing process, or as an addition to a reusable device, container or package. Mechanisms for engagement between a modular heater and the container or package include, but are not limited to, those shown in FIGS. 12 to 20.

Figure 12:
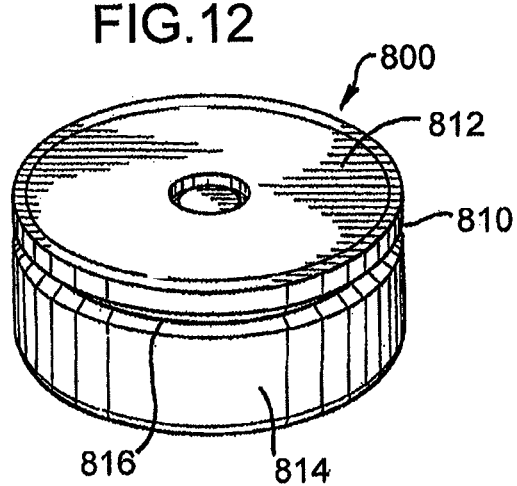
FIG. 12 is a perspective view of another embodiment of a modular heater.
Figure 13:
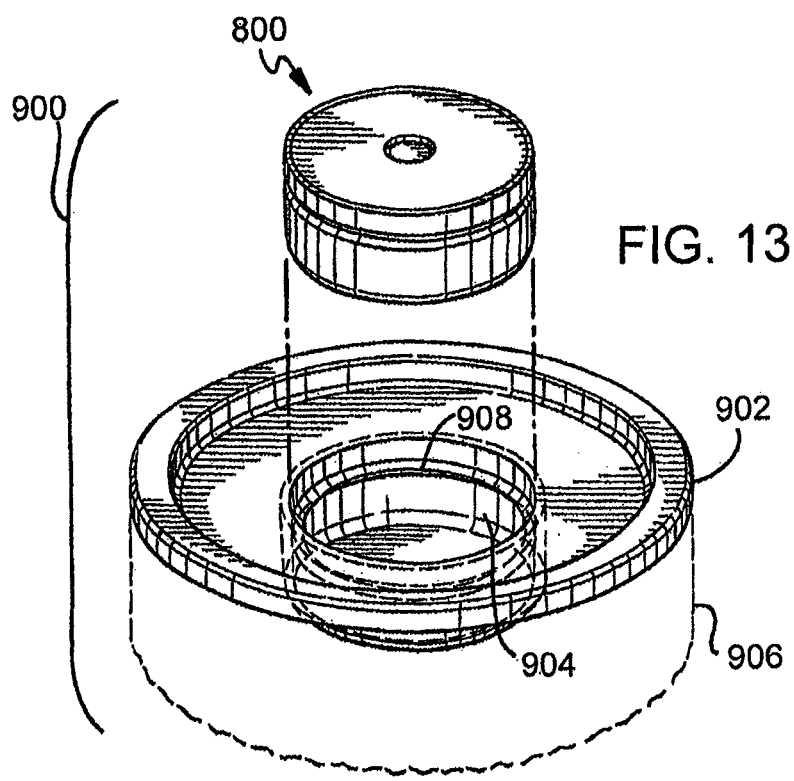
FIG. 13 is an exploded assembly view of a particular embodiment of an end portion of a package heating device having a pocket to accommodate a modular heater embodiment such as those shown in FIGS. 1, 4, 5, and 6.

One such additional embodiment of an exterior package configuration for a heater is illustrated in FIG. 12 as a heater 800. In this particular embodiment, the heater 800 includes a housing 810, which further includes a lid 812 and a container portion 814, together generally defining an exterior shape of the heater 800. As shown in FIG. 12, the container portion 814 includes a retaining groove 816 for use in connection with a retaining mechanism for assembly within a pocket of a container or package. As shown in FIG. 13, an exemplary package heating device 900, which is particularly suitable for canned food items, includes a container end 902 with a pocket 904 configured to accept the heater 800. The container end 902 is designed to be formed onto a container cylinder 906 (partially shown in phantom line) to form a bottom portion of the heating device 900. As shown in FIG. 13, the pocket 904 includes a retaining ridge 908 that correspondingly mates with the retaining groove 816 of the heater 800 when assembled. In such an arrangement, the retaining groove and the retaining ridge can be dimensioned appropriately to provide a desired fit. Preferably, in this particular embodiment, the retaining mechanism will not allow disassembly without undue effort or the use of special tools.

Figure 14A:
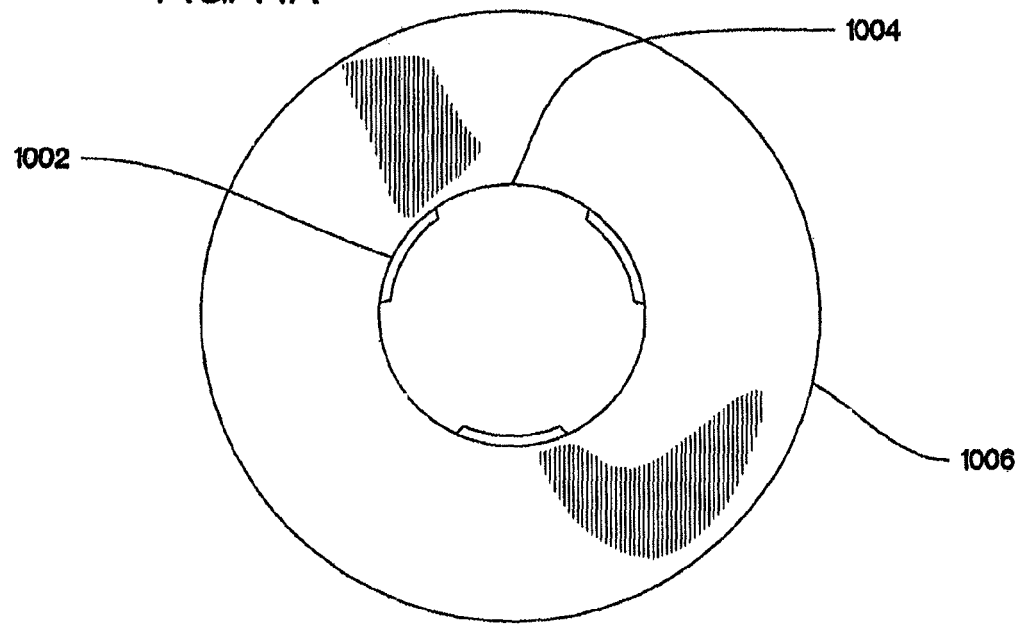
FIG. 14A is a plan view of a container portion in a form of a can end having a pocket formed therein having protrusions to facilitate retention of a modular heater therein.
Figure 14B:
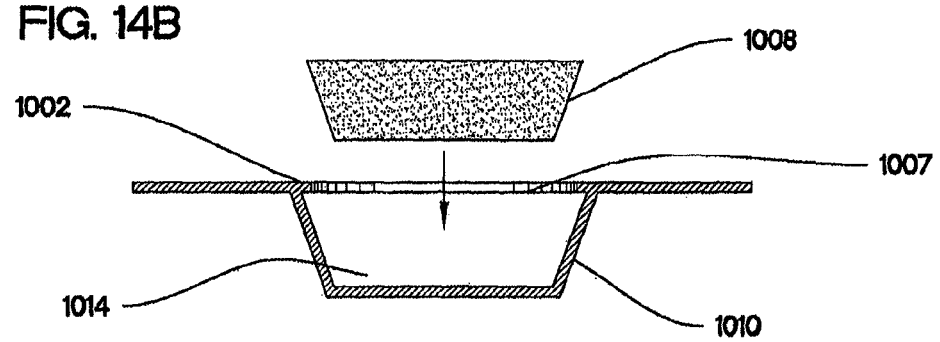
FIG. 14B is a cross-sectional assembly view of the container portion of FIG. 14A and a modular heater.
Figure 15:
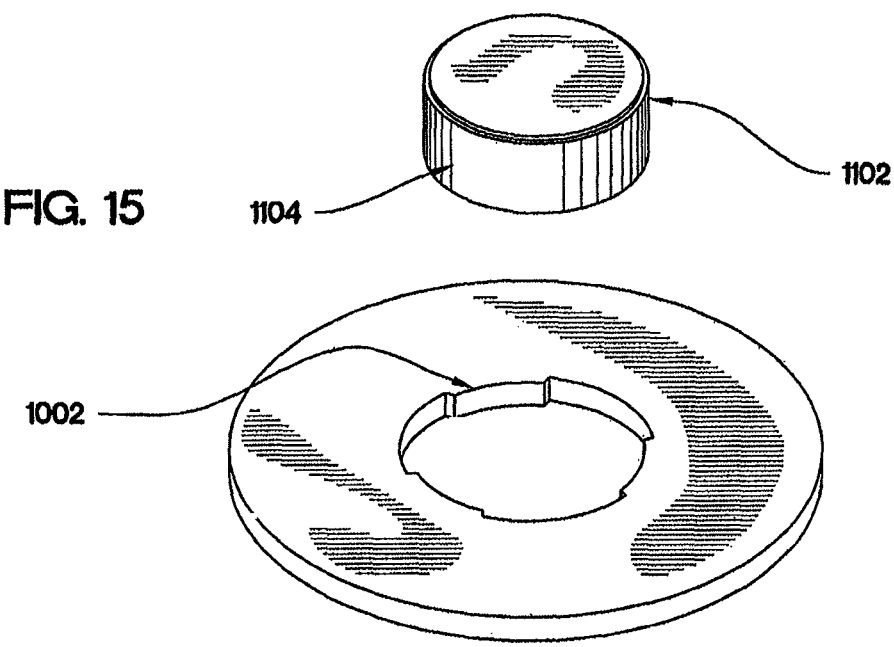
FIG. 15 is a perspective assembly view of a container portion in a form of a can end having a pocket formed therein having protrusions to facilitate retention of a modular heater therein, wherein the modular heater includes a detent.
Figure 16:
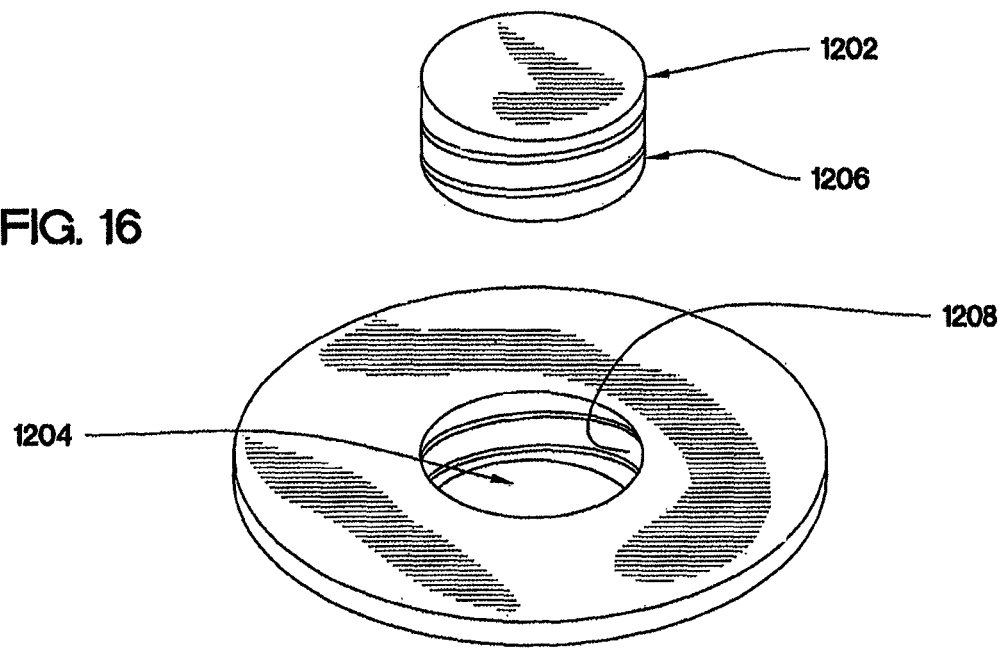
FIG. 16 is a perspective assembly view of a container portion in a form of a can end having a pocket formed therein having a thread arrangement that correspondingly engages a thread arrangement on the heater.

As shown in FIGS. 14-16, additional embodiments of retaining the modular heater include a modified snap-fit arrangement, a detent arrangement and a twist lock arrangement. Again, as previously noted, other mechanisms known in the art are contemplated as well. Referring to FIGS. 14A and B, a snap-fit arrangement includes one or more protrusions 1002 formed in connection with a pocket or receptacle 1004 on a container portion 1006, such as a can end of a can-type container. Other containers or cans having pockets or receptacles are contemplated as well, such as 2-piece or 3-piece can designs known in the canned food industry that have been designed with such pocket or receptacle. In a particular embodiment, one contiguous protrusion is disposed around the periphery of the pocket. In another embodiment, two or more protrusions are disposed around the periphery of the pocket. In this particular embodiment, the protrusions 1002 are formed adjacent an open end 1007 of the pocket so that the protrusion(s) act to retain a modular heater 1008 within the pocket 1004 when assembled. When the modular heater 1008 is fit into the pocket 1004, the protrusions 1002 either deform or cause deflection and flexing of sidewall(s) 1010 of the pocket (or a combination of deformation and flexing) to allow the modular heater 1008 to be inserted and captured in the pocket 1004. Once assembled, the protrusion(s) 1002 capture the modular heater 1008 and act to prevent it from being removed from the pocket 1004.

In an embodiment utilizing a detent, such as that illustrated in FIG. 15, a modular heater 1102 includes one or more grooves or steps 1104 (depending on the geometry of the heater) disposed annularly or peripherally (depending on the geometry of the heater, package, or pocket) around heater 1102 designed to capture at least a portion of the protrusions 1002 previously described with respect to FIG. 14A. This embodiment is similar in concept to that previously described and illustrated in FIG. 13, one difference being that in this embodiment, the detent is disposed adjacent the open end of the pocket so that the protrusion(s) act to retain the modular heater within the pocket when assembled. In a particular embodiment, the modular heater may be configured with a geometry having a shoulder-type design in lieu of a groove wherein the protrusion would capture the modular heater by engaging the shoulder. In yet another embodiment, such as that shown in FIG. 16, a modular heater 1202 may be assembled within a pocket 1204 by utilizing a twist-lock arrangement, which may comprise a threaded arrangement 1206, 1208 between the pocket and the heater, or a combination of protrusions (not shown) incorporated in both the pocket and the heater, wherein the protrusions from the respective components would act upon each other when the heater is disposed within the pocket and twisted, or pushed and twisted. Such twist-lock mechanisms are known in the art and are contemplated herein as an alternative embodiment of retaining the modular heater within the pocket.

Figure 17:
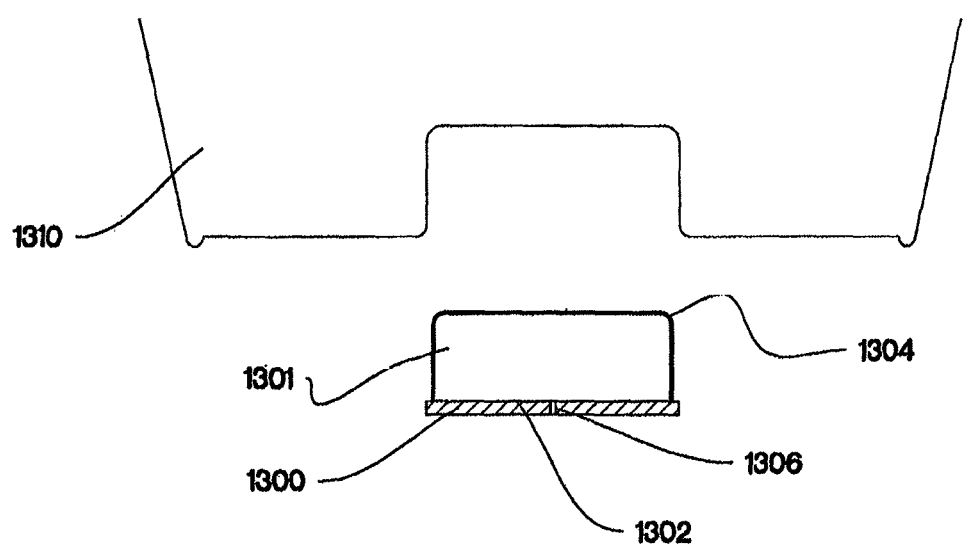
FIG. 17 is a cross-sectional assembly view of a container portion in a form of a can end having an opening formed therein for receiving a heater having a band for engaging with container.

In another embodiment shown in FIG. 17, a modular heater 1300 may be friction or press fit into an associated pocket of a container. Heater 1300 includes a press fit band 1302 to secure heater 1300 to pocket in container 1310. Band 1302 is preferably slightly wider than body 1301 of heater 1300, allowing a secure fit of the band into pocket of container 1310 while providing clearance between body 1301 and container 1310. The rounded contour of the heater edge 1304 provides a lead in for insertion. Heater band 1302 may optionally include one or more air vents 1306 to provide a venting mechanism for the heater 1300 during heating to allow any resulting gases to escape and prevent air lock.

Figure 18A:
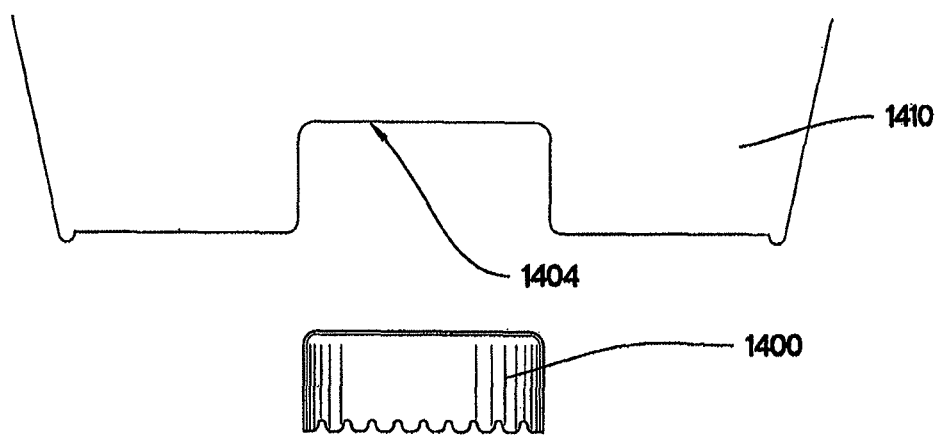
FIG. 18A is a cross-sectional assembly view of a container portion in a form of a can end having an opening formed therein for receiving a heater and adhesive for securing the heater to the container.
Figure 18B:
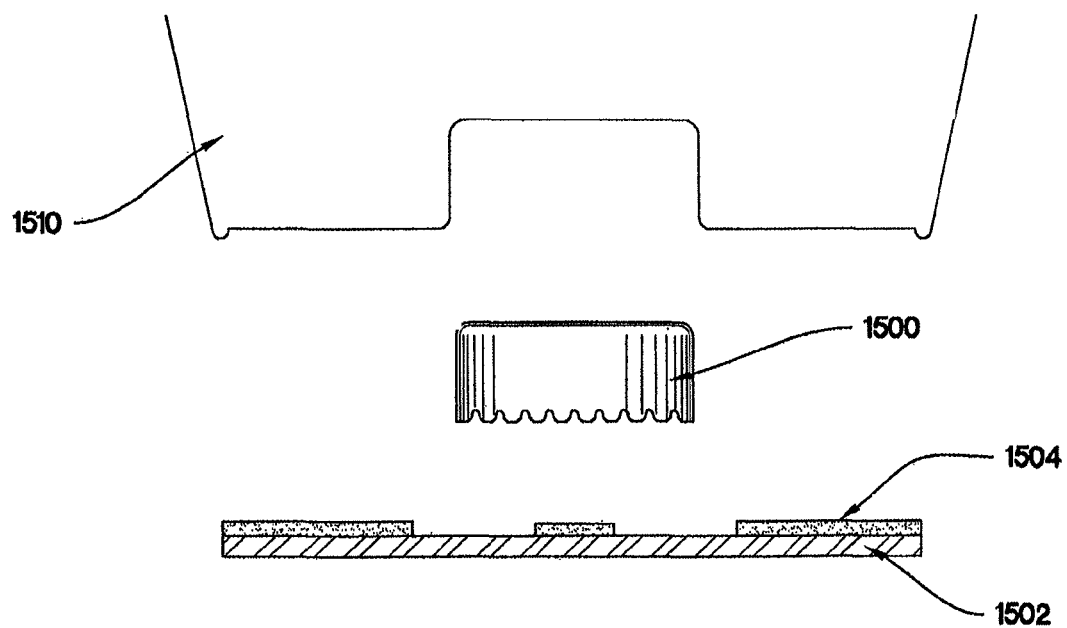
FIG. 18B is a cross-sectional assembly view of a container portion in a form of a can end having a pocket formed therein for receiving a heater and an external bottom insulation layer with thermal adhesive for securing heater to the container.

An additional embodiment is shown in FIGS. 18A and 18B, where heater 1400 is engaged by slip fit with adhesion to the container or package by use of a suitable adhesive 1404. In FIG. 18A, diameter of heater 1400 is sized to slip fit into pocket of container 1410, and a suitable thermal adhesive 1404 (such as Duralco 4703 high temperature epoxy which is stable to 340° C.) in the pocket of container 1410 secures heater 1400 to container 1410. In another alternative embodiment shown in FIG. 18B, diameter of heater 1500 is sized to slip fit into pocket of container 1510. To secure heater 1500 to container 1510, heater 1500 is bonded to an external bottom insulation layer 1502 using a suitable thermal adhesive 1504. Insulation layer 1502/heater 1500 assembly is then bonded to bottom of container 1510 using thermal adhesive 1504.

Figure 19A:
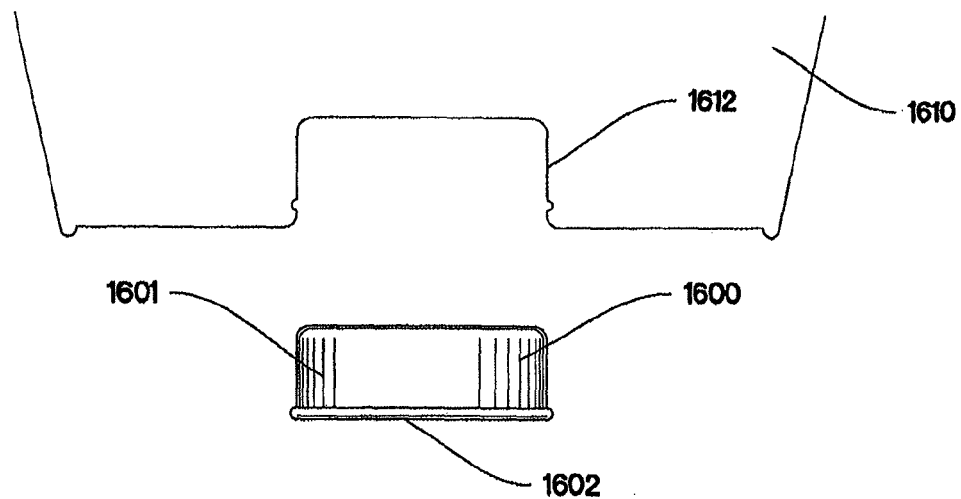
FIG. 19A is a cross-sectional assembly view of a container portion in a form of a can end having a pocket formed therein having a groove that correspondingly engages a ridge on the heater.
Figure 19B:
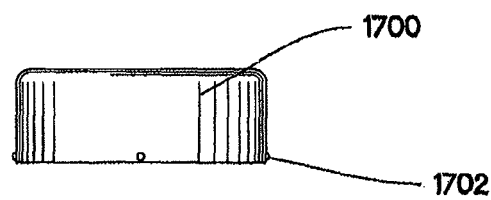
FIG. 19B is a cross-sectional assembly view of an alternative heater with knobs that correspondingly engage with groove of container in FIG. 19A.
Figure 19C:
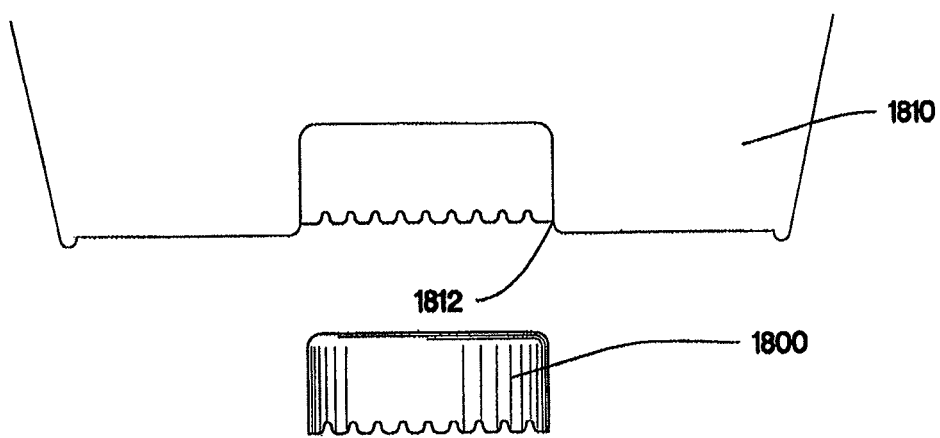
FIG. 19C is a cross-sectional assembly view of a container portion in a form of a can end having a pocket formed therein having a ridge that correspondingly engages the heater.

In additional embodiments shown in FIGS. 19A-C, heater can be "snap fit" into container. In the embodiment shown in FIG. 19A, diameter of heater 1600 is sized to fit into pocket of container 1610 and includes a circumferential ridge 1602 that has a diameter wider than diameter of body 1601. Pocket of container 1610 includes a groove 1612 around the circumference of opening for receiving ridge 1602, such that when heater 1600 is inserted into pocket of container 1610, ridge 1602 snaps into groove 1612 for securing heater 1600 to container 1610. FIG. 19B shows an alternative heater 1700 which includes four or more protrusions 1702 that can snap fit into groove 1612 of container 1610 pocket. The embodiment shown in FIG. 19C is another alternative snap-fit embodiment. In this embodiment, container 1810 has a ridge 1812. Heater 1800 is sized such that it is snap-fit into opening by pushing it past the ridge 1812, whereby the ridge 1812 will hold heater 1800 in place in opening of container 1810.

In another embodiment (not shown) heater may engage with a container by shrink fit, such as by cooling heater to shrink it and inserting it into a pocket of container, whereby warming of the heater will cause it to expand for a firm fit in the pocket of container. Alternatively, container may be heated for expansion of the pocket and after heater is inserted, container cools and shrinks to securely contain heater. In yet another embodiment (not shown), heater may be mechanically attached to container by spot welding, or by threading the heater to threads on the inside of the opening of container.

As previously noted, the pocket may be configured in numerous geometries and cross-sections, some of which may be dictated or influenced by the geometry or type of container or package. A particularly suitable pocket geometry for can ends of canned food designs is a relatively shallow pocket incorporating a draft angle such that a cross-section of the pocket resembles a general trapezoidal shape. The shallow depth and the draft angle makes the can end more easily manufactured. The draft angle also facilitates stacking of multiple can ends, which provides efficiency in shipping and storage of can ends. In such an embodiment, the can ends can be nested together by virtue of the pocket having the draft angled sidewall(s). Furthermore, as shown in FIGS. 14, 20A and 20B, in certain embodiments, rather than a right-angled cylinder or disc shape, the modular heater may incorporate a housing having a similar draft angle design that correspondingly engages the pocket having the draft angled sidewall(s).

Figure 20A:
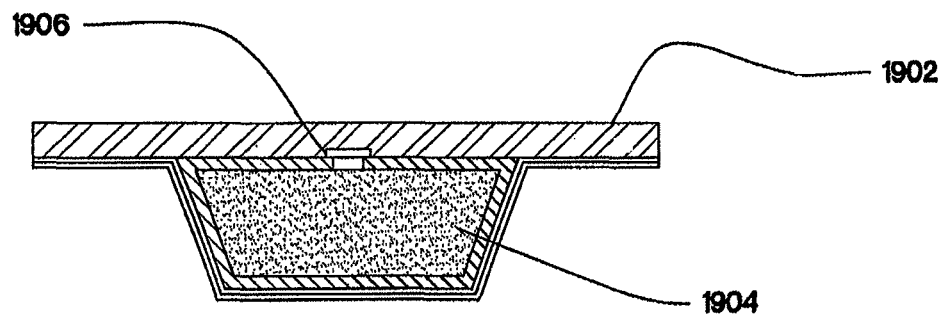
FIG. 20A is a cross-sectional view of a heater disposed within a pocket of a container portion, wherein a flexible insulating layer is disposed over the activation mechanism and heater.
Figure 20B:
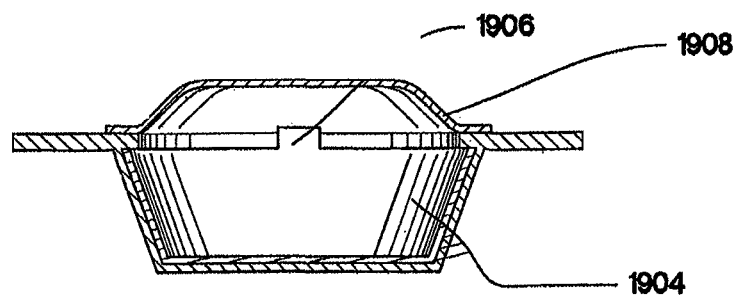
FIG. 20B is a cross-sectional view of a heater disposed within a pocket of a container portion, wherein an insulative cap is disposed over the activation mechanism and heater.

In another embodiment, such as that shown in FIG. 20A, in lieu of, or in addition to a flexible housing portion, a flexible insulating layer of material 1902 may be "overlaid" on top of a modular heater 1904 and activation mechanism 1906 and affixed thereto, essentially sealing the activation mechanism 1906 and providing additional thermal safety to the user. The insulating layer 1902 may be welded, adhered, or otherwise affixed to the heater. In yet another embodiment, such as that shown in FIG. 20B, a cap 1908 or other cover may be formed to cover the activation mechanism 1906 and the heater 1904, such as a cap or cover made from an insulative foil or other material utilized in heated food product applications. The insulating layer 1902 or the cap could be implemented individually or in combination and be configured to allow the activation mechanism to be operated with them in place.

The principles of the present invention may also be applied for use in a "hybrid" package arrangement that utilizes both metal and plastic components. For example, a plastic bowl or other container may be formed with a metal bottom incorporating the aforementioned pocket, which accommodates the modular heater. The metal material is able to withstand the high temperatures attributable to the heater, while the plastic portion of the package provides insulating properties to maintain the temperature of the contained food heated by the heater. The "hybrid" container or package may be formed by numerous methods known in the art for joining metal and plastic parts, such as welding, insert molding, etc.

Figure 21E:
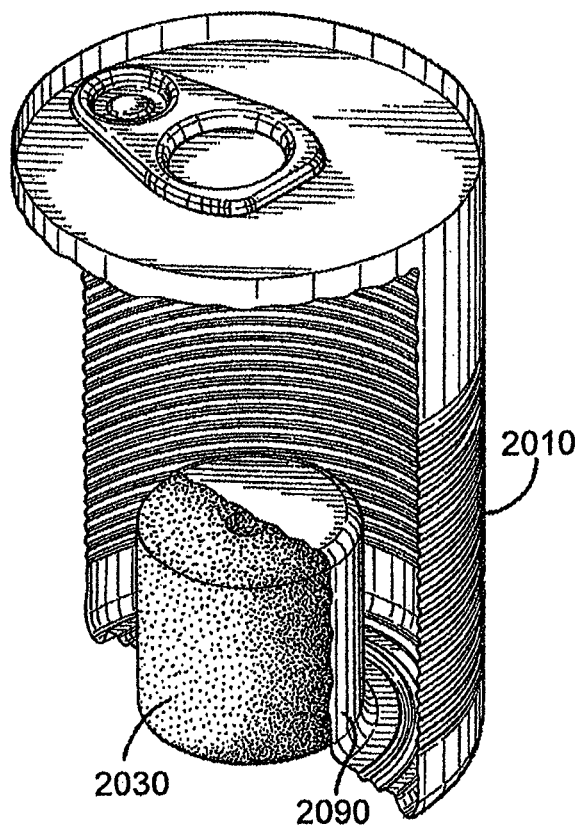
FIG. 21E is a perspective cross-sectional view of an alternative embodiment of a heater package design.

In another embodiment, shown in FIGS. 21A-21E, an amount of solid-state modified fuel 2030 is integrated into a storage can 2010 for a food or liquid 2020. As shown in FIGS. 21A-21C, the storage can 2010 is sealed at the top by a removable lid 2070. An opener tab 2080 is integrated onto the removable lid 2070 to aid a user in opening the can 2010. As shown in FIG. 21D, the bottom of the storage can 2010 is formed with an indented pocket 2090 that allows an amount of modified reaction system fuel 2030 to be encapsulated inside the bottom of the storage can 2010. Those of ordinary skill in the art will also understand that the pocket 2090 can be a variety of shapes, sizes and configurations including but not limited to the cylindrical configuration shown in FIG. 21E without departing from the novel scope of the present invention.

Among others, an advantage of the embodiment depicted in FIGS. 21D and 21E, wherein the fuel or fuel device is fully integrated or "built into" the packaging, is that there are fewer parts and material requirements for assembly. On the other hand, as mentioned above, an advantage of the embodiment depicted in FIG. 21E is that the fuel or fuel device is a discrete component, which may be encapsulated or have its own device structure and be utilized in a modular arrangement. One of ordinary skill in the art will recognize that each of the embodiments depicted and described herein may have unique characteristics or configurations that may translate into one or more advantages over other depicted and described embodiments depending on a particular application.

In normal operation of a heater containing a solid state reaction system within a heating device, the temperatures realized by the heated device are reduced by heat loss to the material being heated. For example, if the heating device in FIG. 10 is filled with water, thermodynamic considerations provide that the interior heated surface of the vessel adjacent to the heater will necessarily be at or below 100° C., the surface temperature being one boundary condition of a continuous thermal gradient extending back to some maximum temperature in the heat generating zone of the solid state chemical reaction. If only air and not water are present in the heating device, the capacity for heat removal is lower and the temperature of the surface is no longer similarly bounded. In this case, with the same total heat output of the heater, much higher temperatures can be reached at the interior of the heater, and then by conductive transfer to the extended surfaces of the heated package or apparatus. In food and beverage applications, typically by design the container contents should not exceed preferred serving temperatures of about 60 to 70° C. and for user comfort and safety no point on the surface of the package should exceed about 54° C.

The modular heater and related apparatus disclosed herein are designed for thermal balance in normal operation by utilizing the food mass within the container or package as a heat sink. In the event that the material that would normally absorb the heat is not present, for example, if the food were spilled out of the container or if the container was accidentally not filled during the packaging process, then excessive temperatures could be reached within the heater or the heated apparatus upon activation of the heater. Inadvertent activation during shipping or handling of bare heaters not installed into a package are other potential occurrences that could lead to severe overheating. To address these concerns, thermal shutdown of the chemical reaction is a safety feature that can be used with the present invention.

To prevent severe overheating, a mechanism may be incorporated into the heater to shut it down when a predetermined threshold temperature is sensed at a point or points in the system, such that the heater does not discharge its full energy content. In a preferred embodiment, from a practical cost standpoint, this auto-shutdown functionality is achieved via a simple passive feedback mechanism. Passive thermal shutdown of the heater could also be used to assure that inadvertent activation of a single heater in a container of closely packed heaters being stored or transported would not lead to thermal activation of adjacent heater elements, a potential fire hazard.

Other less severe circumstances may arise in which some form of passive or active control of the heater apparatus is desirable. For instance if just a portion of the contents to be heated was removed from the package but the degree of overheating was not sufficient to engage the heater shutdown mechanism, it would be beneficial to have a means of dissipating the excess energy that could otherwise lead to overheating of the lesser remaining contents and package surfaces.

A heater, with a given energy content heating a given mass, will produce approximately the same overall change in temperature; depending on the starting temperature of the contents, different endpoint temperatures will be achieved. Thus, where the same heating device operating at a cold location (for example, 5° C.) would only heat a portion of soup to a dissatisfying 45° C., the heating device operated at a hot location (for example, 38° C.), would heat the same portion to 78° C., which is too hot for safe consumption. Here again it would be beneficial to provide a passive means of capping the maximum temperature of the heated substance to provide a safer and more uniform user experience independent of the ambient temperature.

Further, because even for the same substance to be heated there may be varied user preferences, such that one consumer may prefer a serving temperature of 60° C. and another may prefer 70° C., it would be beneficial to incorporate a means whereby a user preferring a lower serving temperature could selectively dissipate some of the heat energy away from the food portion.

The current invention includes means of achieving various types and levels of thermal control as appropriate to the various circumstances of need described above. These may be used in conjunction with basic package thermal safety elements, such as thermal insulation, heater overcap, lip guard, and thermographic indicator labels.

With respect to auto-shutdown of the heater, it is understood that solid state reaction kinetics are modeled as a combustion system in which a solid flame front moves through preheat, reaction and quench zones. For reaction self-propagation to occur, the heat generated in the reaction zone must trigger reaction ahead of the wave front. Disruption of the heat or mass transfer at flame front can halt the reaction propagation.

The rates of chemical reactions generally increase rapidly with increased system temperature such that overheating once commenced could lead to autocatalytic thermal runaway. Thus, the moderated solid state reaction systems of the present invention underpin passive thermal controls of the system. The rate of reaction and hence heat generation power is a key metric for an energetic material in consumer heating applications. Controlled propagation enables the rate of heat generation of the system to be matched to the rate at which the heat can be efficiently transferred to substance being heated. A moderated reaction velocity also means that there is time in the system for the passive mechanism to operate. Preferred reaction systems have reaction propagation velocities of less than 1 mm s$^{-1}$, giving controlled heating times of about one to four minutes.

There are a variety of physical or chemical responses of various materials that occur at certain specific temperatures or ranges that might be used to affect such a passive auto-shutdown mechanism. These include, for example: phase changes (solid melting or subliming, liquid vaporizing), volume changes, and thermochemical decomposition. Passive auto-shutdown of the solid state reaction can be accomplished by arranging for one or more of these material response processes, triggered by exceeding a certain threshold temperature at some point in the heater device, to disrupt the heat and mass transfer at the flame front of the chemical reaction such that reaction propagation conditions are not maintained.

For example, an auto-shutdown system could be achieved through dimensional changes or movement of a bimetallic strip construction integrated into the heater. For example, referring to FIG. 3, if the reaction regulator element 120 were of a bimetallic construction it could be arranged so that internal heating above a predetermined threshold temperature would cause a deflection that displaced the unreacted heater mass from contact with the flame front.

An alternative embodiment of a passive auto-shutdown mechanism would be the use of an intumescent material coated onto an interior surface of the heater canister or incorporated into the bulk matrix of the chemical composition. An intumescent material is a substance that swells markedly (up to 100 times) as a result of heat exposure, thus increasing in volume, and decreasing in density and thermal conductivity to form an insulating barrier. Intumescence can be caused by rapid evaporation and expansion of molecules (often water) trapped in crystalline structures. Intumescent formulations with preferred onset temperatures can be devised by intercalating into the crystalline host matrix, materials that evaporate, sublime, or decompose to gas products in the temperature range of interest.

Referring to FIG. 6, one use of an intumescent material for thermal control is to coat the inner surface 280 of the heater container 210 beneath the solid state chemical heating composition 230 with a thin layer of sodium silicate or other intumescent such that excessive temperatures at the surface, cause rapid, uneven expansion of the coating, forcing sections of the solid state reaction matrix 230 into void spaces or the compressible insulator 270 thereby breaking the contiguous connection of reaction layer 230. Low thermal conductivity of the solid state chemical heating composition 230 reduces heat transfer and combustion rate. Thus, an intumescent material could alternatively be incorporated into the bulk matrix of the solid state chemical heating composition 230. For example, powdered vermiculite (unexpanded) or other intumescent solid could be filled into the interstitial spaces of a packed bed of granulated particles of the solid state heating composition 230. Whereas prior to activation and at moderate operating temperatures the granules are packed in close thermal contact, excessive temperatures by design lead to rapid expansion of the intumescent phase that pushes the reactive granulate particles apart and interrupts the propagation of heat to sustain the reaction front.

In another alternative embodiment, a phase change might be used to cause depletion or reduced mass transfer of an essential reactant to the solid state reaction front. For example, one embodiment of a solid state reaction system described herein is sustained by a finely divided powder formed of chlorate oxidizer uniformly distributed throughout the reactive phase. The chlorate melts at a lower temperature and is more volatile relative to other components present. Certain rates of heating of the reaction matrix well ahead of the reaction front can cause some portion of the chlorate to melt and agglomerate into a coarser distribution that impedes mass transfer, or even evaporate and dissipate through pores in the bed away from the heated zone before the fuel is heated to activation temperature. Alternatively, another relatively low melting solid material could be added into the reaction mix or the heater such that when the solid melts, the flow of fluid material encapsulates or otherwise disrupts mass transfer of reactants.

Flame retardants, defined as various classes of chemicals that are incorporated into plastics and other materials to inhibit the spread of oxygen-supported fires, can be formulated into the heater device or the solid state reaction matrix to prevent thermal runaway. In yet another alternative use of reactant depletion at the flame front to cause heater shutdown, certain flame retardants such as organohalogen or organophosphorus compounds could slow or stop the reaction by gas phase quenching of radical reaction intermediates of the solid state reaction, such as oxygen ions from the thermal decomposition of chlorate. Chlorinated and brominated materials, for example, undergo thermal degradation and release hydrogen chloride and hydrogen bromide that react with the highly reactive radicals in the flame, resulting in an inactive molecule and a Cl– or Br– radical with lower energy and thus less tendency to propagate the radical oxidation reactions of combustion.

It is generally the case that the onset temperature of the thermally responsive materials in relation to the normal operating temperature of various zones in the heater or heating device, as well as their response mode, is key in determining an appropriate point of use, in the system. For example, organohalogen flame retardants that are activated at temperatures of 200 to 300° C. may not be well suited for inclusion in the solid state reaction matrix where they may too easily decompose under normal operating conditions, but are preferentially incorporated into cooler zones of the heater such as in the insulator component 270 or on the interior of the heater lid 220 in FIG. 6.

Another class of flame retardants comprises chemical compounds that undergo endothermic chemical decomposition when subjected to high temperatures. Conventional flame retardants of this class used in polymers include: magnesium and aluminium hydroxides, together with various hydrates and carbonates, but endothermic decomposition is common to a broad range of common and low-cost materials suitable for the heater device. Table 2 describes several endothermically decomposing solid (EDS) compounds, including some conventional flame retardants, which undergo decomposition at various onset temperatures. Many of these compounds when thermally decomposed give off carbon dioxide and/or water as gaseous byproducts. High specific enthalpies of decomposition that reduce the effective quantity required for endothermic cooling are characteristic of preferred materials.

TABLE 2

Properties of Various Endothermically Decomposing Solid (EDS) Compounds

| Formula | Approx. onset of decomposition (° C.) | Approx. enthalpy of decomposition (kJ g$^{-1}$) | Gaseous decomposition products |
|---|---|---|---|
| Calcium sulfate [CaSO$_4$•2H$_2$O] | 60-130 | — | H$_2$O |
| Sodium bicarbonate [NaHCO$_3$] | 70-150 | 1.53 | H$_2$O, CO$_2$ |

TABLE 2-continued

Properties of Various Endothermically Decomposing Solid (EDS) Compounds

| Formula | Approx. onset of decomposition (° C.) | Approx. enthalpy of decomposition (kJ g$^{-1}$) | Gaseous decomposition products |
|---|---|---|---|
| Alumina trihydrate [Al(OH)$_3$] | 180-200 | 1.30 | H$_2$O |
| Magnesium hydroxide [Mg(OH)$_2$] | 300-320 | 1.45 | H$_2$O |
| Huntite (mineral) [Mg$_3$Ca(CO$_3$)$_4$] | 450 | 0.99 | CO$_2$ |
| Siderite (mineral) [FeCO$_3$] | 550 | — | CO$_2$ |
| Calcium carbonate [CaCO$_3$] | 825 | 1.78 | CO$_2$ |

An alternative embodiment of a passive auto-shutdown mechanism is achieved by formulating certain EDS materials into the solid state reaction matrix, such that when a threshold temperature is reached, their enthalpy of decomposition causes energy to be subtracted from the system, and thereby cool or quench the heat producing solid state reaction. Further, as with intumescent additives, rapid expansion of the reaction matrix by gaseous products of endothermic decomposition can be an additive contribution to destabilization of the flame front, and EDS's with gaseous decomposition products may also be beneficially applied as a coating of interior heater surfaces as described earlier. In order that they should not act prematurely, the most preferred EDS for inclusion in the reaction mixture have an onset temperature of 300° C. or higher; preferred materials, shown in Table 2, include magnesium hydroxide, siderite, and calcium carbonate.

EDS's with lower onset temperatures shown in Table 2 may be applied in other forms of passive thermal controls external to the heater unit and at other points in the heating device. Referring to FIG. 10, in an embodiment of a passive thermal control not involving auto-shutdown of the heater reaction, a coating containing, for example, calcium sulfate, or sodium bicarbonate or mixtures thereof is applied to the exterior wall 620 of the heated vessel 602. If the wall temperature then exceeds 50 to 70° C., the EDS materials in the coating will begin passive endothermic cooling. Favorably, for higher temperature excursions, the rate of chemical decomposition is accelerated and passive endothermic cooling accordingly enhanced. The EDS could alternatively be applied as a coating on the interior surface of a thermally insulating label (not shown) to be applied around heated vessel 602, or the EDS may compounded directly into the material used to form the insulating label.

Generally, the higher temperature zones of the heating device will be in the vicinity of the heater's exterior surfaces and higher temperatures in these regions will provide correspondingly greater driving force for cooling by EDS. In addition to calcium sulfate and sodium bicarbonate, alumina trihydrate or other EDS compounds with slightly higher onset temperatures would also be suitable and could be incorporated for use in the vicinity of the heater. Positioning a mass of EDS in close proximity to, or in contact with, the surface of the heater can be used to effect an embodiment of a thermal control for the heating device that can be either passive or active. For example, referring to FIG. 20A, an appropriate point of use for the EDS mass or component (not shown) would be in a recess between the heater 1904 and the thermal insulator 1902, or alternatively the EDS may even be directly incorporated into the insulator 1902. In an embodiment of passive thermal control, the EDS mass or component would be positioned in fixed contact with the heater surface. Alternatively providing a means for the user to vary the extent of contact of the EDS mass with the heater or heated surfaces, and thereby increase or decrease the endothermic cooling effect could be used to provide a selective degree of active control to a user.

It is noted that while the descriptions herein may make use of the terms package, container, device, etc. to describe numerous forms of a vessel for holding a substance to be heated in accordance with the principles of the invention, including reusable, recyclable, and disposable vessels, it should be understood that each of these terms is intended to cover all such embodiments in a non-limiting manner. Again, consistent with other embodiments disclosed herein, the heater may be fully integrated with the container or package.

Again, it is noted that applications of the invention are not limited to the SHFP applications described above. A heating component or modular heater in accordance with the present invention, such as the heater described above, could be incorporated into a wide array of applications where heating would be desirable.

While one or more specific embodiments have been illustrated and described in connection with the present invention, it is understood that the present invention should not be limited to any single embodiment, but rather construed in breadth and scope in accordance with recitation of the appended claims.

What is claimed is:

1. A heater for use as a source of heating a substance contained in a heating device, the heater comprising:
   a housing defining an exterior shape of the heater and an interior space, the housing comprising a canister portion and a lid portion, wherein the lid portion is flexible;
   a solid state chemical heating composition disposed within the housing; and
   an activation mechanism capable of communication with the composition and having an actuator and disposed within the housing such that the actuator is actuable from outside of the heating device when heater is coupled to the heating device, wherein the actuator is disposed adjacent to the lid portion and is actuable by flexing the lid portion, and wherein the activation mechanism comprises a piston, a blister pouch containing a first reaction initiation material, and a pellet comprising a second reaction initiation material and in communication with the solid state chemical heating composition, wherein the pellet further contains fibrous particulates to promote wicking and rapid absorption of first reaction initiation material; the piston, blister pouch and pellet being arranged within the heater such that when the lid portion is depressed, the piston is depressed and ruptures the blister pouch, thereby allowing the first reaction initiation material to contact the pellet and initiate a chemical reaction between the first reaction initiation material and the second reaction initiation material that generates sufficient thermal energy to initiate reaction of the solid state chemical heating composition;
   wherein the canister and the lid of housing are sealed together.

2. The heater of claim 1 wherein the heater further includes a flexible insulating layer between the solid state chemical heating composition and the lid portion.

3. The heater of claim 1, wherein the composition is comprised of a first fuel component, a second fuel component, a solid oxidizer, and a thermal diluent.

4. The heater of claim 1, further comprising a mechanism to automatically shut down the heater when a predetermined threshold temperature is reached by the reaction of the solid state chemical heating composition.

5. The heater of claim 4, wherein the mechanism comprises an intumescent material coated on an interior surface of the heater.

6. The heater of claim 4, wherein the mechanism comprises an intumescent material incorporated into the solid state chemical heating composition.

7. The heater of claim 4, wherein the mechanism comprises a flame retardant incorporated into the heater to slow the reaction of the solid state chemical heating composition by gas phase quenching of reaction intermediates of the solid state chemical heating composition.

8. A heating device comprising:
a heating chamber defining an interior space for receiving and storing a substance to be heated;
a pocket adjacent to the heating chamber for receiving a modular heater; and
a modular heater comprising a housing comprising a canister portion and a lid portion sealed together and defining an exterior shape of the heater and a sealed interior space, wherein the lid portion is flexible,
the modular heater further comprising a solid state chemical heating composition and an activation mechanism disposed within the sealed interior space, the modular heater disposed within the pocket;
wherein the actuation of activation mechanism generates sufficient thermal energy to initiate a chemical reaction of the solid state chemical heating composition, wherein the activation mechanism is disposed adjacent to the lid portion and is actuable by flexing the lid portion, and wherein the activation mechanism comprises a piston, a blister pouch containing a first reaction initiation material, and a pellet comprising a second reaction initiation material and in communication with the solid state chemical heating composition, wherein the pellet further contains fibrous particulates to promote wicking and rapid absorption of first reaction initiation material; the piston, blister pouch and pellet being arranged within the heater such that when the lid portion is depressed, the piston is depressed and ruptures the blister pouch, thereby allowing a first reaction initiation material to contact the pellet and initiate a chemical reaction between the first reaction initiation material and a second reaction initiation material that generates sufficient thermal energy to initiate reaction of the solid state chemical heating composition.

9. The heater of claim 8, wherein the composition is comprised of a fuel component, a solid oxidizer, and a thermal diluent.

10. The heating device of claim 8, wherein the pocket includes a retaining groove to retain the modular heater within the pocket.

11. The heating device of claim 10, wherein the modular heater includes a ridge that correspondingly mates with the retaining groove to secure the modular heater to heating device.

12. The heating device of claim 10, wherein the pocket and the heater each have an annular-shaped periphery, and wherein the retaining groove is an annular groove about the periphery of the pocket and the ridge is an annular ridge about the periphery of the heater.

13. The heating device of claim 10, wherein the heater includes one or more protrusions that snap-fit into the retaining groove to secure the heater to the heating device.

14. The heating device of claim 8, further comprising a retaining ridge at a bottom of the pocket wherein the heater is secured to the heating device by inserting the heating device into the pocket to engage the retaining ridge.

15. The heating device of claim 8, wherein the pocket includes a threaded surface.

16. The heating device of claim 15, wherein the heater includes a threaded surface that is configured to correspondingly engage the threaded surface of the pocket for securing the heater to the heating device.

17. The heating device of claim 8, further comprising an adhesive for securing the heater to the heating device.

18. The heating device of claim 8, further comprising an external insulation layer, wherein the heater is secured to the insulation layer using an adhesive and wherein the heater is inserted into the pocket and the insulation layer is secured to the heating device using an adhesive.

19. The heating device of claim 8, wherein heater comprises a band having a diameter larger than the diameter of the heater and sized for an interference fit into the pocket to secure the heater to the heating device.

* * * * *